(12) United States Patent
Chen et al.

(10) Patent No.: US 12,294,734 B2
(45) Date of Patent: May 6, 2025

(54) SPATIAL NEIGHBOR BASED AFFINE MOTION DERIVATION

(71) Applicant: BEIJING DAJIA INTERNET INFORMATION TECHNOLOGY CO., LTD., Beijing (CN)

(72) Inventors: Wei Chen, Beijing (CN); Xiaoyu Xiu, Beijing (CN); Yi-Wen Chen, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/933,552

(22) Filed: Sep. 20, 2022

(65) Prior Publication Data

US 2023/0011286 A1 Jan. 12, 2023

Related U.S. Application Data

(63) Continuation of application No. PCT/US2021/023115, filed on Mar. 19, 2021.
(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

2018/0309990 A1 10/2018 Alshina et al.
2019/0335196 A1 10/2019 Zhang et al.
(Continued)

FOREIGN PATENT DOCUMENTS

WO 2018002021 A1 1/2018
WO 2018209067 A1 11/2018

OTHER PUBLICATIONS

Bross et al.( "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, Mar. 12, 2020, hereinafter Bross) (Year: 2020).*
(Continued)

*Primary Examiner* — Samuel D Fereja
(74) *Attorney, Agent, or Firm* — Myers Bigel, P.A.

(57) ABSTRACT

An electronic apparatus performs a method of coding video data. The method includes receiving, from a bitstream of the video data, a first syntax that indicates an affine motion model enabled for a current coding block, estimating parameters of the affine motion model using gradients of motion vectors of multiple spatial neighboring blocks of the current coding block, and constructing motion vectors of the affine motion model for the current coding block by using the estimated parameters. In some embodiments, constructing motion vectors further includes converting the estimated parameters into control point motion vectors (CPMVs), and adding the CPMVs into a current affine merge candidate list. In some embodiments, constructing motion vectors further includes deriving a motion vector predictor for an affine mode.

18 Claims, 16 Drawing Sheets

Related U.S. Application Data

(60) Provisional application No. 62/992,704, filed on Mar. 20, 2020.

(51) Int. Cl.
  *H04N 19/139* (2014.01)
  *H04N 19/159* (2014.01)
  *H04N 19/167* (2014.01)
  *H04N 19/176* (2014.01)
  *H04N 19/196* (2014.01)
  *H04N 19/70* (2014.01)

(52) U.S. Cl.
  CPC ......... *H04N 19/159* (2014.11); *H04N 19/167* (2014.11); *H04N 19/176* (2014.11); *H04N 19/197* (2014.11); *H04N 19/70* (2014.11)

(56) References Cited

U.S. PATENT DOCUMENTS

| | | | |
|---|---|---|---|
| 2020/0092577 A1 | 3/2020 | Huang et al. | |
| 2020/0092578 A1* | 3/2020 | Huang | H04N 19/52 |

OTHER PUBLICATIONS

Bross, Benjamin, et al., "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, BE, pp. 1-481, Mar. 12, 2020.

Extended European Search Report corresponding to European Patent Application No. 21771954.1 (14 pages) (dated Mar. 18, 2024).

Bross, et al., "Versatile Video Coding Editorial Refinements on Draft 10", 132. MPEG Meeting; Oct. 12, 2020-Oct. 16, 2020; Online; (Motion Picture Expert Group or ISO/IEC JTC1/SC29/WG11), No. m55625 (Oct. 16, 2020).

Cordula Heithausen, et al., "Inter Prediction using Estimation and Explicit Coding of Affine Parameters", 120. MPEG Meeting; Oct. 23, 2017-Oct. 27, 2017; Macau; (Motion Picture Expert Group or ISO/IEC JTC1/SC29/ WG11), No. m41484 (Oct. 20, 2017).

Han, et al., "CE4.1.3: Affine motion compensation prediction", 11. JVET Meeting; Jul. 11, 2018-Jul. 28, 2018; Ljubljana; (The Joint Video Exploration Team of ISO/IEC JTC1/SC29/WG11 and ITU-T SG.16), No. JVET-K0337 (Jul. 3, 2018).

* cited by examiner

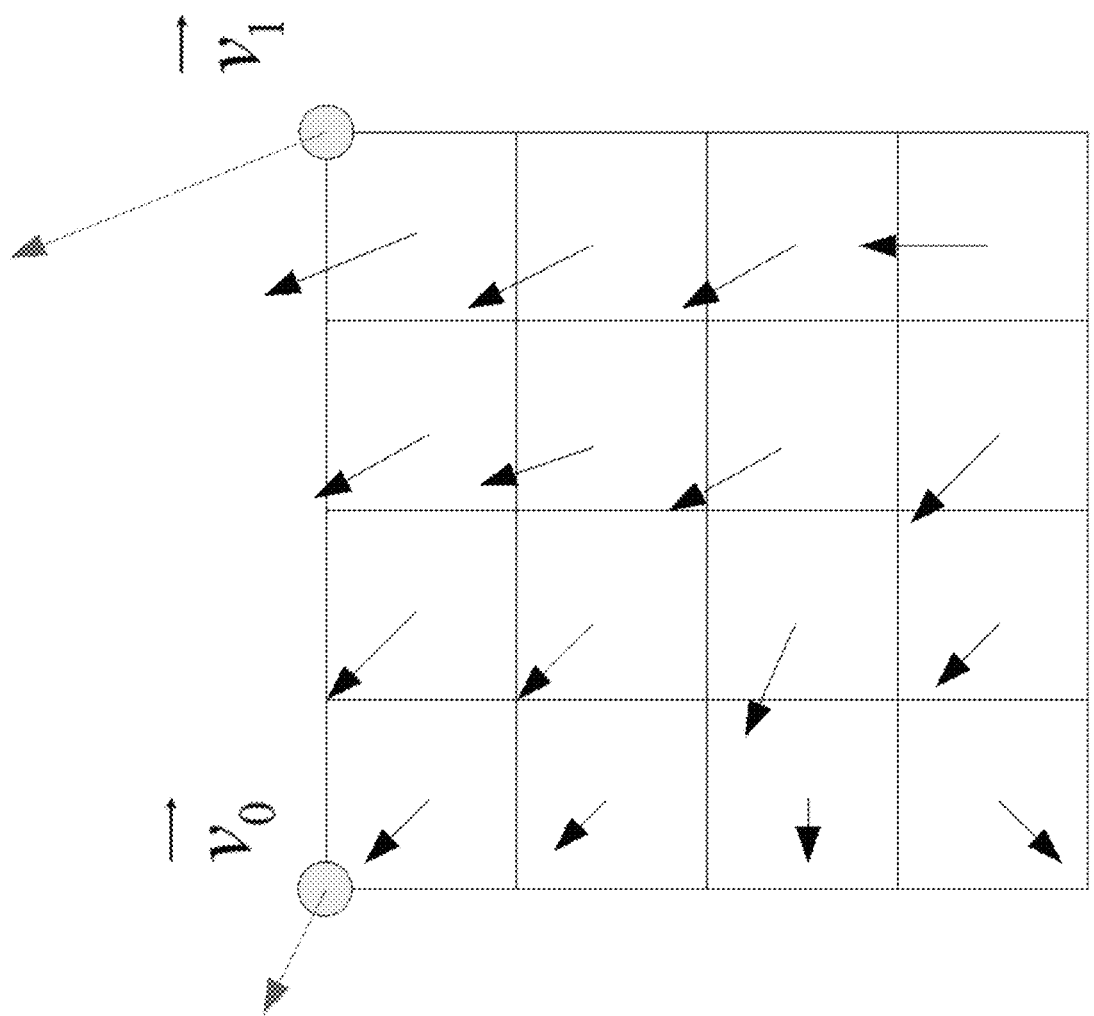

SPATIAL NEIGHBOR BASED AFFINE MOTION DERIVATION

RELATED APPLICATION

The present application is a continuation of International Application No. PCT/US2021/023115 filed Mar. 19, 2021, which application claims priority to U.S. Provisional Patent Application No. 62/992,704, entitled "SPATIAL NEIGHBOUR BASED AFFINE MOTION DERIVATION" filed Mar. 20, 2020, the contents of which are incorporated by reference in their entireties.

TECHNICAL FIELD

The present application generally relates to video coding and compression, and more specifically, to methods and apparatus on improving the coding efficiency of deriving an affine motion model.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards. Some well-known video coding standards include Versatile Video Coding (VVC), High Efficiency Video Coding (HEVC, also known as H.265 or MPEG-H Part 2) and Advanced Video Coding (AVC, also known as H.264 or MPEG-4 Part 10), which are jointly developed by ISO/IEC MPEG and ITU-T VCEG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and apparatus on improving the coding efficiency of deriving an affine motion model based on motion information from the spatial neighboring blocks.

According to a first aspect of the present application, a method of coding video data includes receiving, from a bitstream of the video data, a first syntax that indicates an affine motion model enabled for a current coding block; estimating parameters of the affine motion model using gradients of motion vectors of multiple spatial neighboring blocks of the current coding block; and constructing motion vectors of the affine motion model for the current coding block by using the estimated parameters.

In some embodiments, constructing motion vectors further includes: converting the estimated parameters into control point motion vectors (CPMVs), and adding the CPMVs into a current affine merge candidate list.

In some embodiments, constructing motion vectors further includes: deriving a motion vector predictor for an affine mode.

In some embodiments, constructing motion vectors further includes: calculating motion vector difference (MVD) of a respective control point motion vector (CPMV) based on the derived motion vector predictor of the respective CPMV.

According to a second aspect of the present application, an electronic apparatus includes one or more processing units, memory and a plurality of programs stored in the memory. The programs, when executed by the one or more processing units, cause the electronic apparatus to perform the method of coding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of coding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 6 is a block diagram illustrating an exemplary affine motion vector prediction (AMVP) per sub-block in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC, which provides approximately 30% bit-rate savings over the HEVC standard.

In the current VVC and AVS3 standards, motion information for the current coding block is either directly copied from spatial neighboring blocks in the form of merge mode candidates or based on motion estimation and explicit signaling of motion information. In this disclosure, the motion information for the current block is not copied from spatial neighboring blocks but calculated from an affine motion model which is derived from the motion information of the neighboring blocks. The methods and systems on how to derive and use affine motion model based on motion information of spatial neighboring blocks are disclosed herein.

Figure 1:
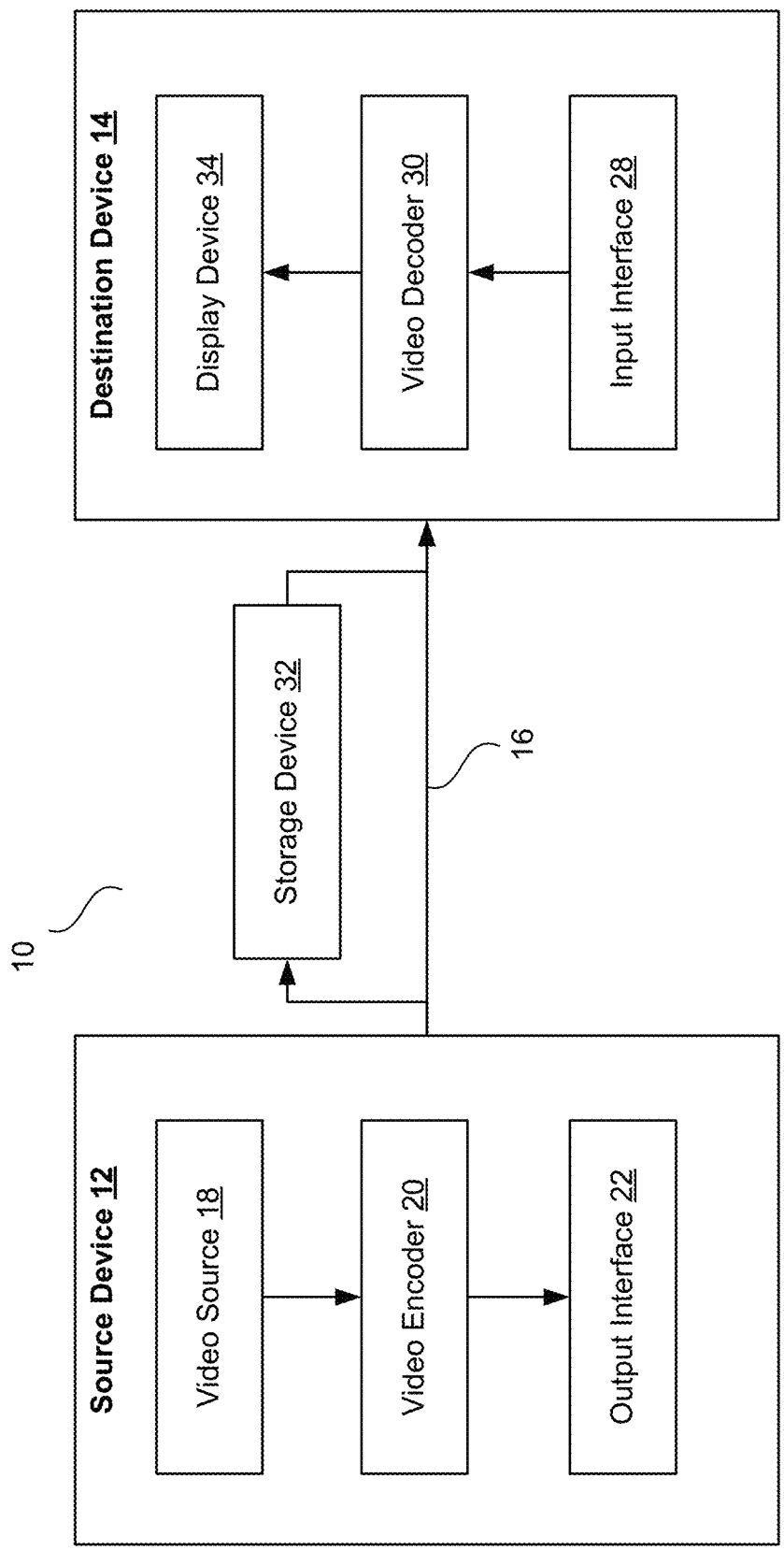
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), AVS, or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
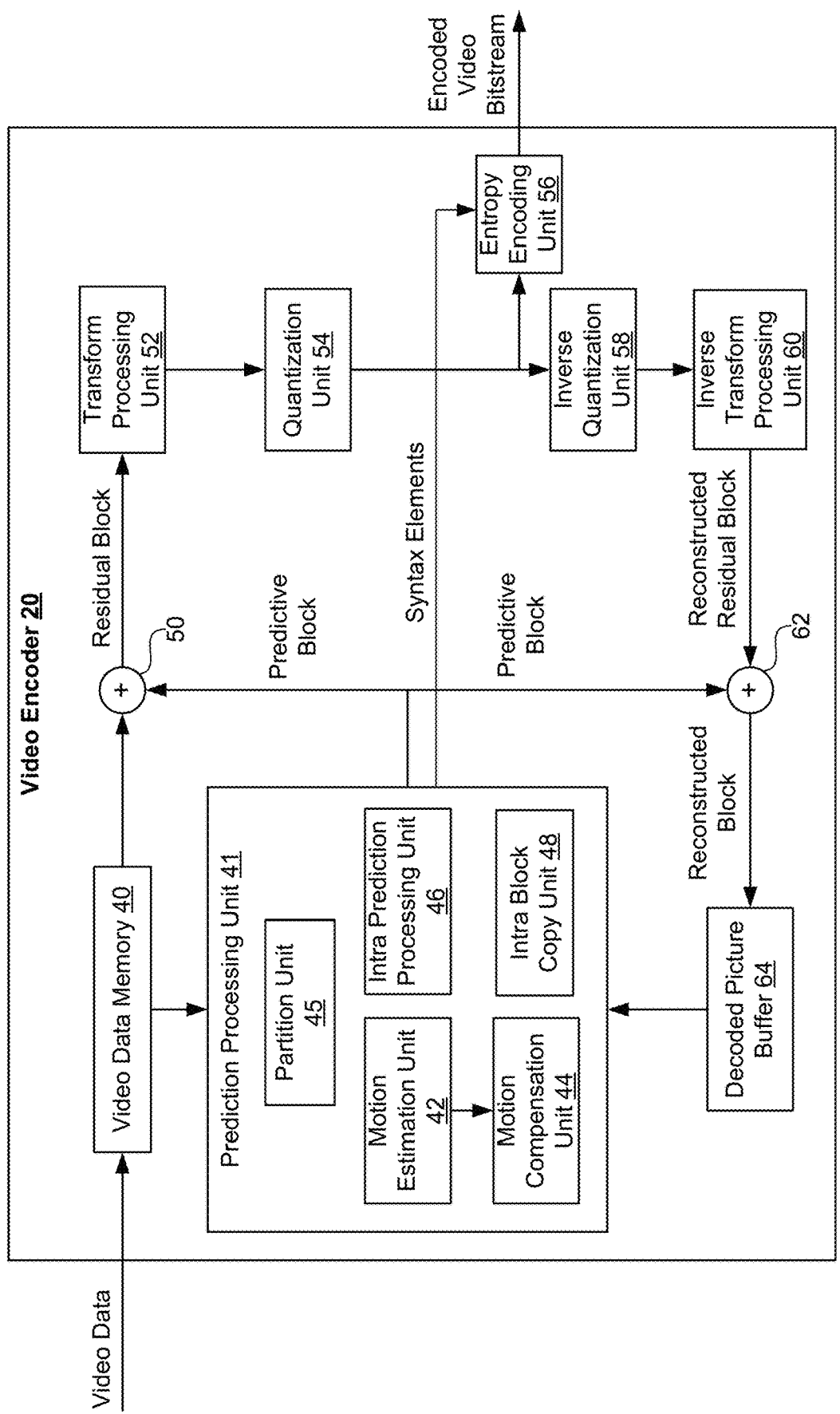
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in-loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
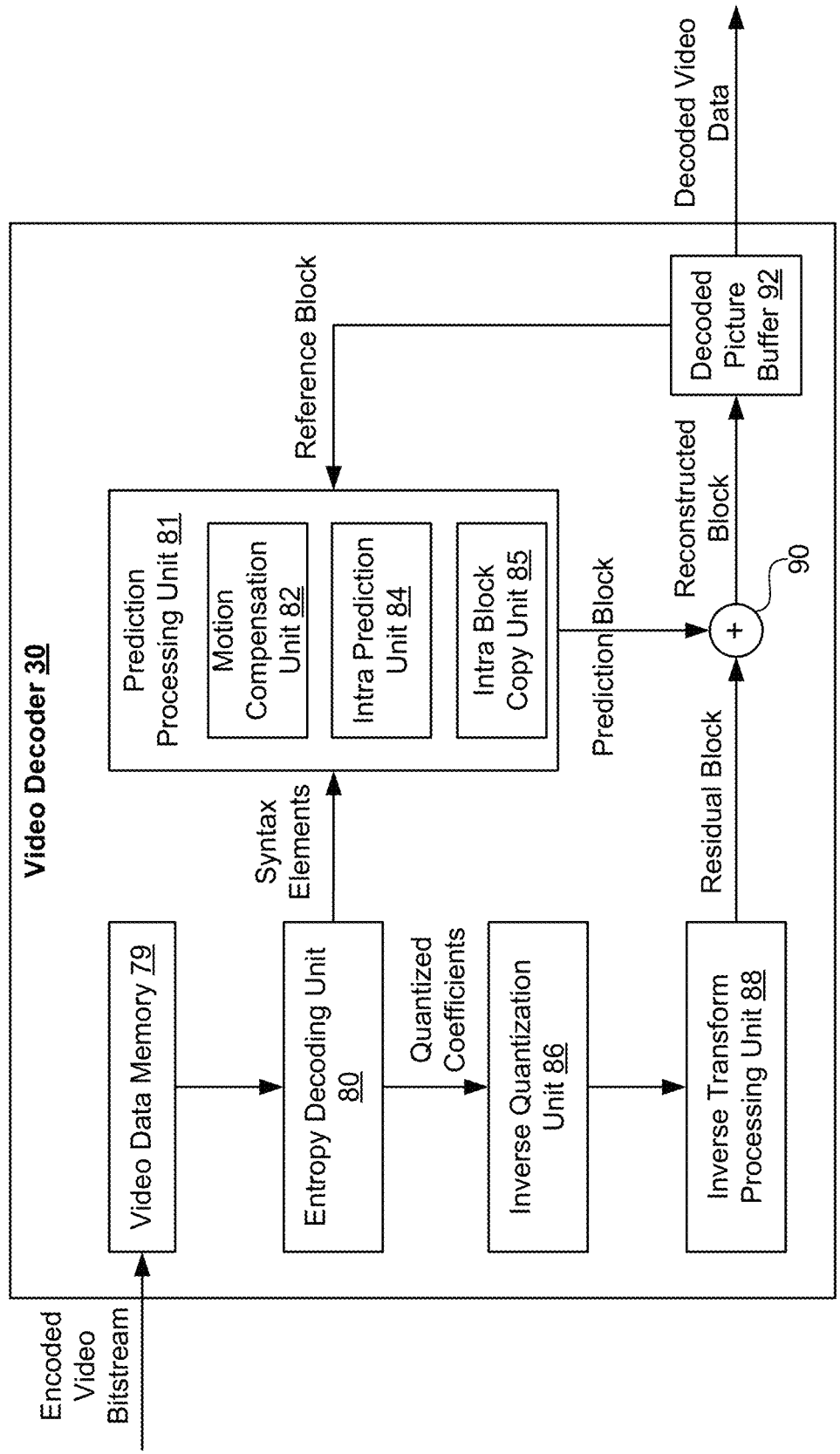
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Like the HEVC, the AVS3 standard is built upon the block-based hybrid video coding framework. The input video signal is processed block by block (called coding units (CUs)). Different from the HEVC which partitions blocks only based on quad-trees, in the AVS3, one coding tree unit (CTU) is split into CUs to adapt to varying local characteristics based on quad/binary/extended-quad-tree. Additionally, the concept of multiple partition unit type in the HEVC is removed, i.e., the separation of CU, prediction unit (PU) and transform unit (TU) does not exist in the AVS3. Instead, each CU is always used as the basic unit for both prediction and transform without further partitions. In the tree partition structure of the AVS3, one CTU is firstly partitioned based on a quad-tree structure. Then, each quad-tree leaf node can be further partitioned based on a binary and extended-quad-tree structure.

Figure 4A:
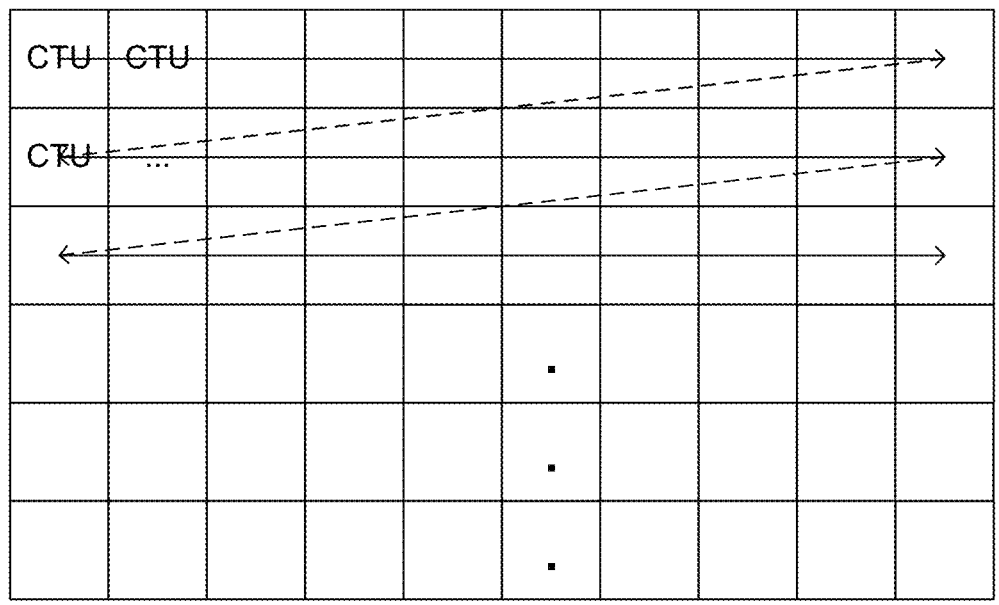
FIGS. 4A through 4E are block diagrams illustrating how a frame is recursively partitioned into multiple video blocks of different sizes and shapes in accordance with some implementations of the present disclosure.
Figure 4B:
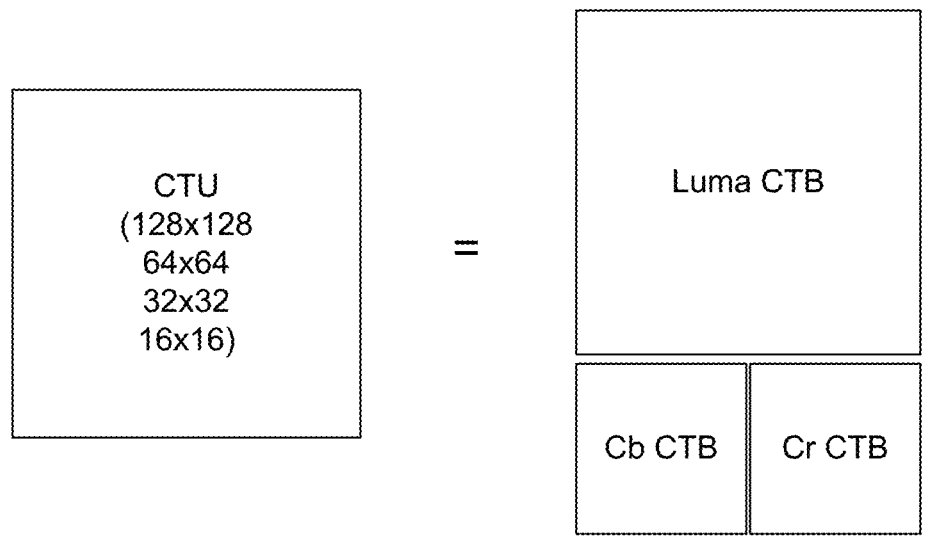

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
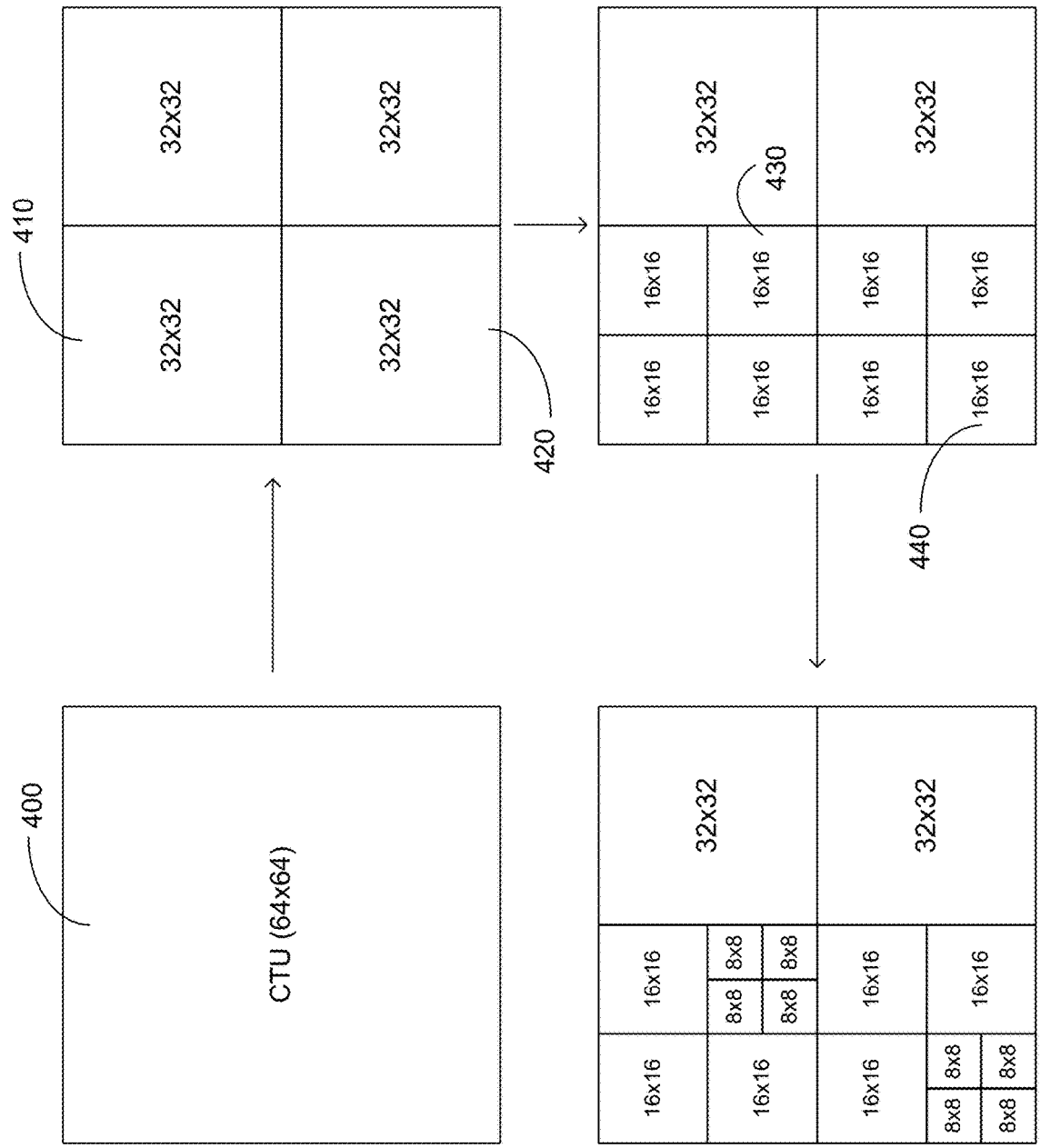
Figure 4D:
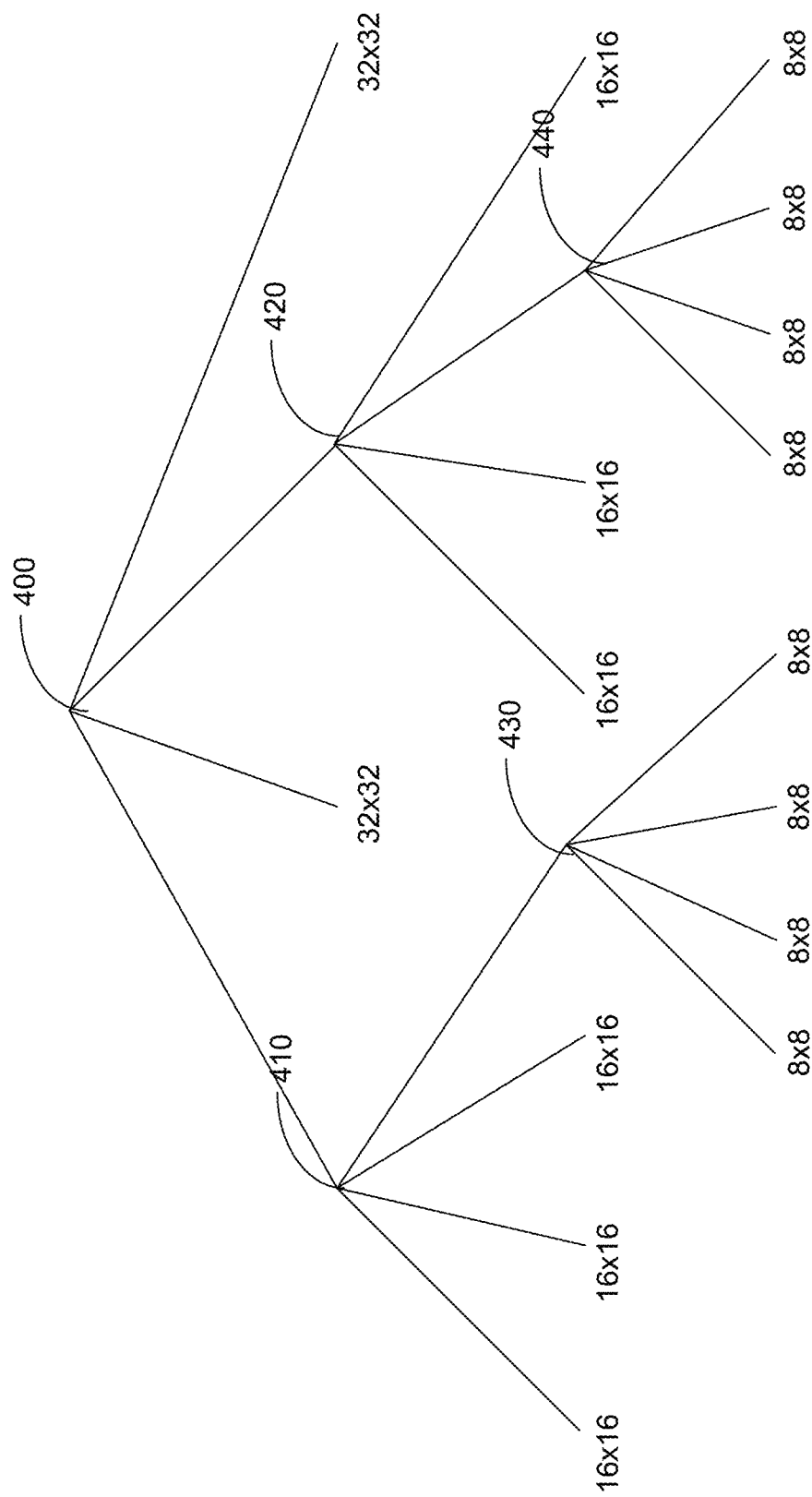
Figure 4E:
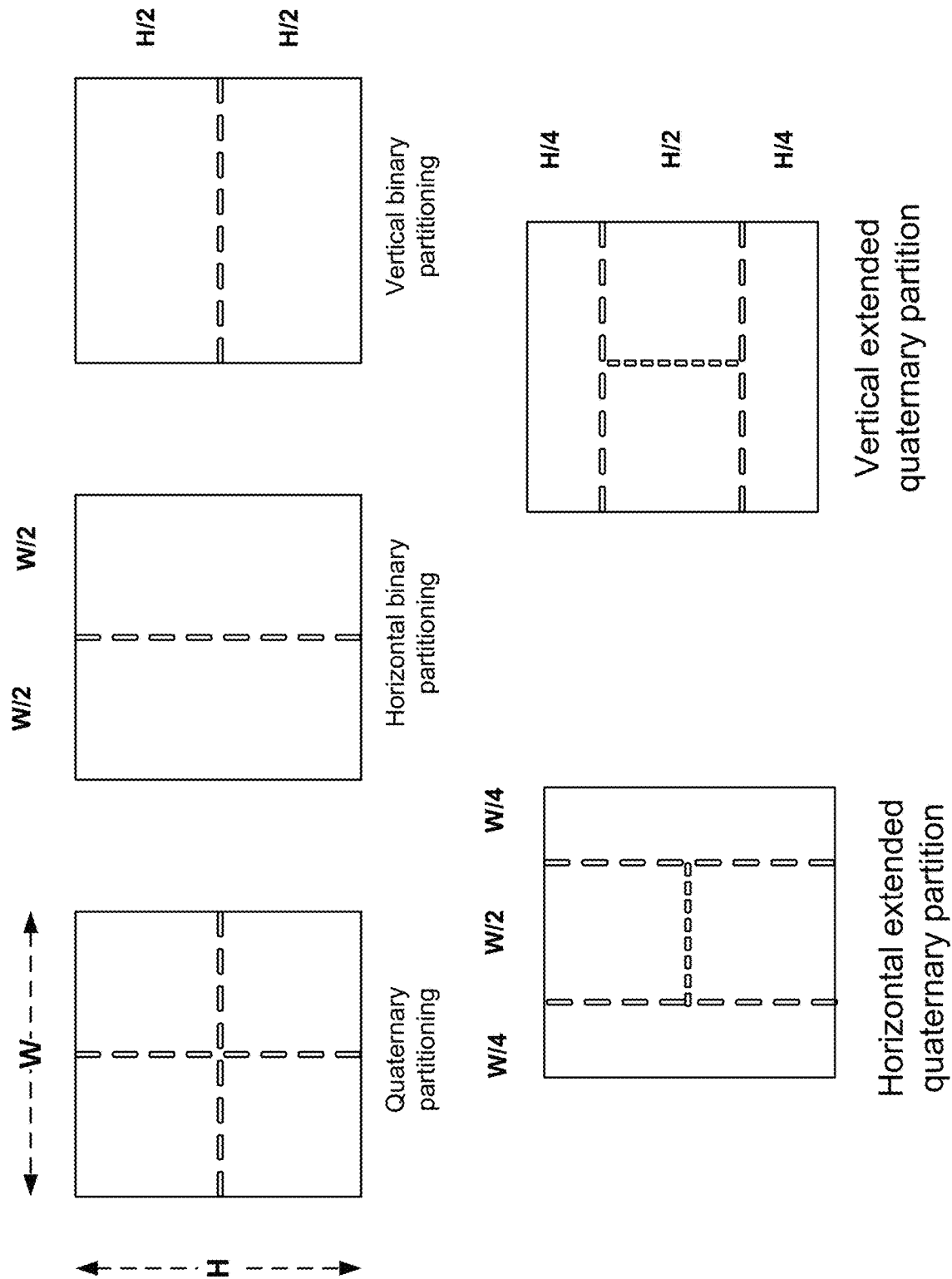

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, and each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five splitting/partitioning types in the AVS3, i.e., quaternary partitioning, horizontal binary partitioning, vertical binary partitioning, horizontal extended quad-tree partitioning, and vertical extended quad-tree partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

In some embodiments, there are different ways of signaling prediction modes. In VVC, each CU could be coded as skip mode or non-skip mode. For a CU coded as non-skip mode, syntax elements are further signaled to indicate if the current CU is coded as intra mode, inter mode, intra block copy (IBC) mode or palette (PLT) mode. These modes are termed as "MODE_INTRA", "MODE_INTER", "MODE_IBC" and "MODE_PLT" respectively in the VVC specification. For a CU coded as inter mode, the prediction signal can be generated by the pixels from the reference pictures which are not the current picture. Moreover, one flag is further signaled for a CU coded as inter mode to indicate whether current CU is merge mode. For a merge mode coded CU, several different types of merge modes are further signaled using additional syntax elements. These different types of merge modes including regular merge modes, subblock merge modes, merge mode with MV difference (MMVD), combined inter and intra prediction (CIIP) and triangle merge mode.

In some embodiments, in VVC, the merge candidate list is constructed by including the following five types of candidates in order: Spatial MVP (i.e. motion vector predictor) from spatial neighbour CUs, Temporal MVP from collocated CUs, History-based MVP from a FIFO table, Pairwise average MVP, and Zero MVs.

The size of merge list is signaled in slice header and the maximum allowed size of merge list is 6 in VVC. For each CU code in merge mode, an index of best merge candidate is encoded using truncated unary binarization (TU). The first bin of the merge index is coded with context and bypass coding is used for other bins. In the following context of this disclosure, this extended merge mode is also called regular merge mode since its concept is the same as the merge mode used in HEVC.

In some embodiments, in HEVC, only translation motion model is applied for motion compensated prediction. While in the real world, there are many kinds of motion, e.g. zoom in/out, rotation, perspective motions and other irregular motions. In VVC and AVS3, affine motion compensated prediction is applied by signaling one flag for each inter coding block to indicate whether the translation motion model or the affine motion model is applied for inter prediction. In the current VVC and AVS3 design, two affine modes, including 4-parameter affine mode and 6-parameter affine mode, are supported for one affine coding block.

Figure 5B:
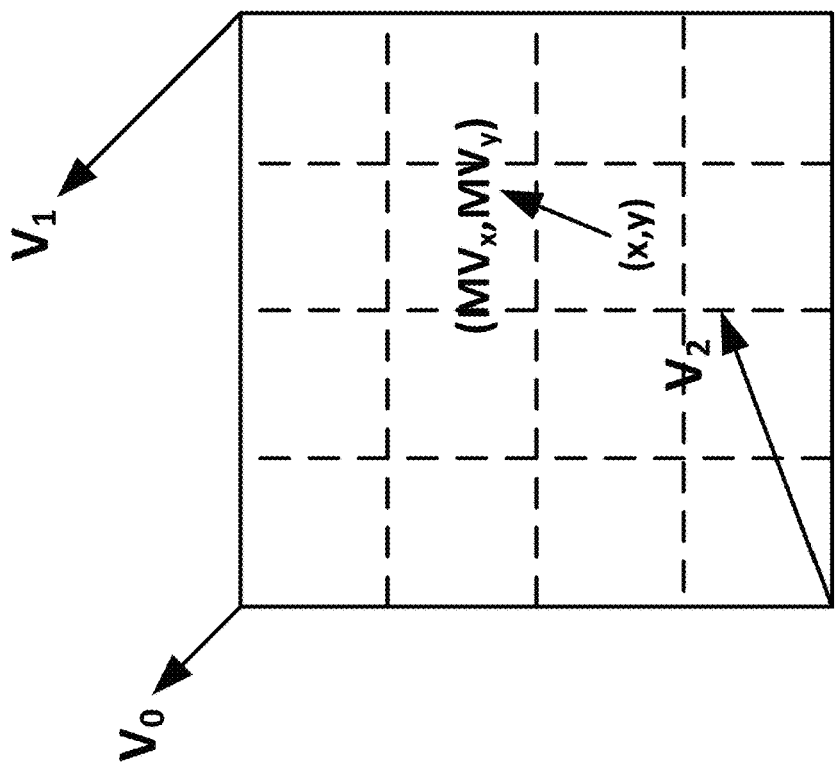
FIGS. 5A and 5B are block diagrams illustrating an exemplary control point based affine motion model in accordance with some implementations of the present disclosure.
Figure 5A:
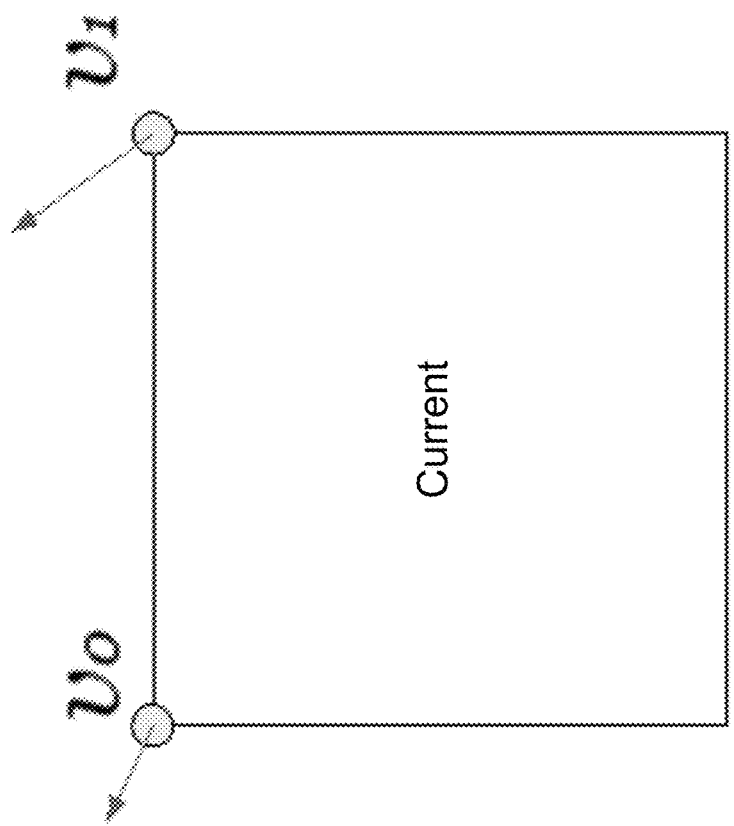

FIGS. 5A and 5B are block diagrams illustrating an exemplary control point based affine motion model in accordance with some implementations of the present disclosure. FIG. 5A illustrates a 4-parameter affine model. FIG. 5B illustrates 6-parameter affine model.

As shown FIGS. 5A and 5B, the affine motion field of the block is described by motion information of two control point (4-parameter) $V_0$ and $V_1$ or three control point motion vectors (6-parameter), $V_0$, $V_1$ and $V_2$.

The 4-parameter affine model has the following parameters: two parameters for translation movement in the horizontal and vertical directions respectively, one parameter for zoom motion and one parameter for rotational motion for both directions. In this model, the horizontal zoom parameter is equal to the vertical zoom parameter, and the horizontal rotation parameter is equal to the vertical rotation parameter. To achieve a better accommodation of the motion vectors and affine parameters, those affine parameters are to be derived from two MVs (which are also called control point motion vector (CPMV)) located at the top-left corner and top-right corner of a current block as shown in FIG. 5A. The affine motion field of the block is described by two CPMVs ($V_0$, $V_1$). Based on the control point motion, the motion field ($v_x$, $v_y$) of one affine coded block is described as:

$$v_x = \frac{(v_{1x} - v_{0x})}{w}x - \frac{(v_{1y} - v_{0y})}{w}y + v_{0x} \quad (1)$$

$$v_y = \frac{(v_{1y} - v_{0y})}{w}x + \frac{(v_{1x} - v_{0x})}{w}y + v_{0y}$$

The 6-parameter affine mode has the following parameters: two parameters for translation movement in the horizontal and vertical directions respectively, two parameters for zoom motion and rotation motion respectively in the horizontal direction, another two parameters for zoom motion and rotation motion respectively in the vertical direction. The 6-parameter affine motion model is coded with three CPMVs. As shown in FIG. 5B, the three control points of one 6-parameter affine block are located at the top-left, top-right and bottom left corner of the block. The motion at top-left control point is related to translation motion, and the motion at top-right control point is related to rotation and zoom motion in the horizontal direction, and the motion at bottom-left control point is related to rotation and zoom motion in the vertical direction. Compared to the 4-parameter affine motion model, the rotation and zoom motion in the horizontal direction of the 6-parameter may not be same as those motions in the vertical direction. Assuming ($V_0$, $V_1$, $V_2$) are the MVs of the top-left, top-right and bottom-left corners of the current block in FIG. 5B, the motion vector of each sub-block $(v_x, v_y)$ is derived using the three MVs at control points as:

$$v_x = v_{0x} + (v_{1x} - v_{0x}) * \frac{x}{w} + (v_{2x} - v_{0x}) * \frac{y}{h} \quad (2)$$
$$v_y = v_{0y} + (v_{1y} - v_{0y}) * \frac{x}{w} + (v_{2y} - v_{0y}) * \frac{y}{h}$$

Where $(v_{0x}, v_{0y})$ is motion vector of the top-left corner control point, $(v_{1x}, v_{1y})$ is motion vector of the top-right corner control point, and $(v_{2x}, v_{2y})$ is motion vector of the bottom-left corner control point. w is the width and h is the height of the block.

FIG. 6 is a block diagram illustrating an exemplary affine motion vector prediction (AMVP) per sub-block in accordance with some implementations of the present disclosure. In order to simplify the motion compensation prediction, block based affine transform prediction is applied. To derive motion vector of each 4×4 luma sub-block, the motion vector of the center sample of each sub-block, as shown in FIG. 6, is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

As done for translational motion inter prediction, there are also two affine motion inter prediction modes: affine merge mode and AMVP mode.

In some embodiments, affine merge prediction mode (AF_MERGE mode) can be applied for CUs with both width and height larger than or equal to 8. In this mode the control point motion vectors (CPMVs) of the current CU are generated based on the motion information of the spatial neighboring CUs. There can be up to five CPMV predictor (CPMVP) candidates and an index is signaled to indicate the one that is used for the current CU. The following three types of CPMVP candidates are used to form the affine merge candidate list: (1) Inherited affine merge candidates that are extrapolated from the CPMVs of the neighbour CUs; (2) Constructed affine merge CPMVPs that are derived using the translational MVs of the neighbour CUs; (3) Zero MVs.

Figure 7:
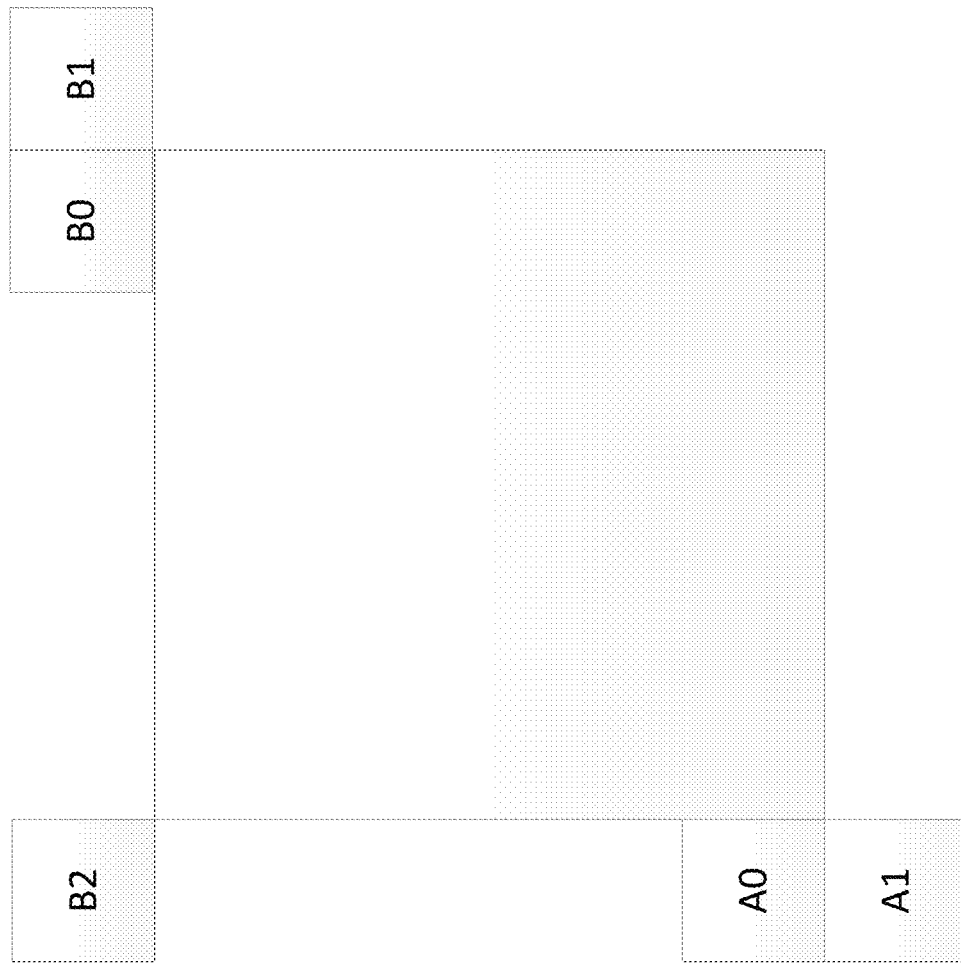
FIG. 7 is a block diagram illustrating the exemplary locations of inherited affine motion predictors in accordance with some implementations of the present disclosure.

FIG. 7 is a block diagram illustrating the exemplary locations of inherited affine motion predictors in accordance with some implementations of the present disclosure. In VVC, there are maximum two inherited affine candidates which are derived from affine motion model of the neighboring blocks, one from left neighboring CUs and one from above neighboring CUs. The candidate blocks are shown in FIG. 7. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU.

Figure 8:
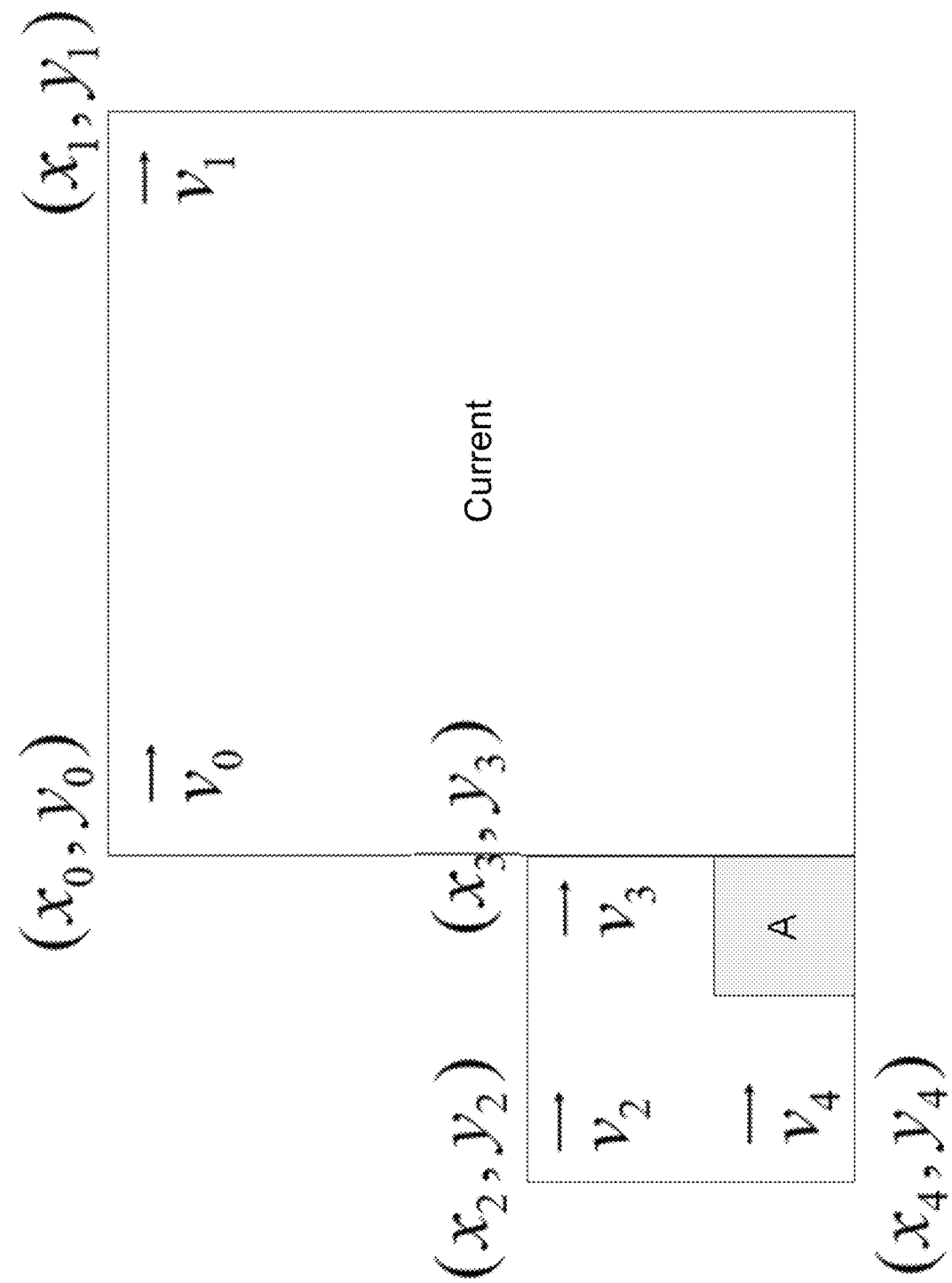
FIG. 8 is a block diagram illustrating the exemplary control point motion vector inheritance in accordance with some implementations of the present disclosure.

FIG. 8 is a block diagram illustrating the exemplary control point motion vector inheritance in accordance with some implementations of the present disclosure. As shown in FIG. 8, if the neighboring left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 9:
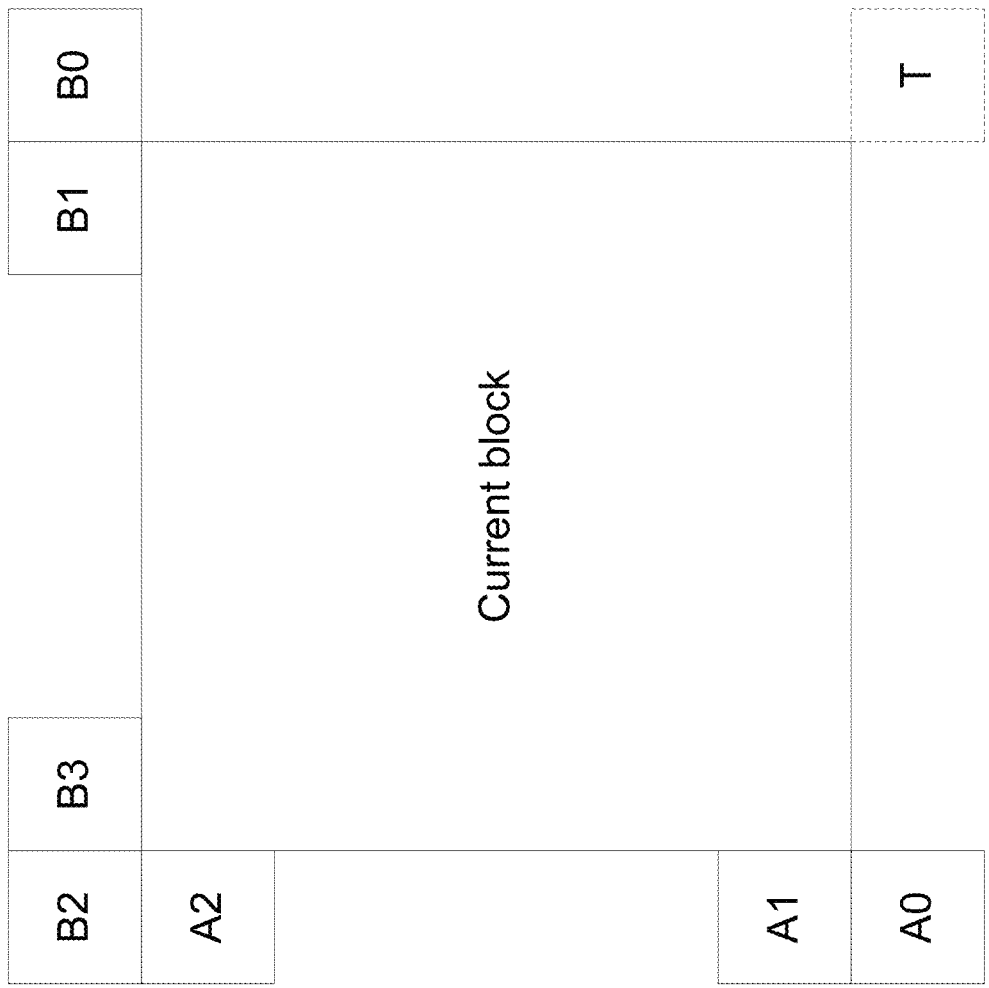
FIG. 9 is a block diagram illustrating the exemplary locations of candidate positions for constructed affine merge mode in accordance with some implementations of the present disclosure.

FIG. 9 is a block diagram illustrating the exemplary locations of candidate positions for constructed affine merge mode in accordance with some implementations of the present disclosure. A constructed affine candidate is constructed by combining the neighbor translational motion information of each control point. The motion information for the control points is derived from the specified spatial neighbors and temporal neighbor shown in FIG. 9. CPMVk (k=1, 2, 3, 4) represents the k-th control point. For $CPMV_1$, the B2→B3→A2 blocks are checked in order and the MV of the first available block is used. Likewise, $CPMV_2$ is derived by checking the B1→B0 blocks in order. $CPMV_3$ is derived by checking the A1→A0 blocks in order. TMVP is used as $CPMV_4$ if it's available.

After MVs of four control points are obtained, affine merge candidates are constructed based on the motion information. The following combinations of control point MVs are used to construct in order:
$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$ The combination of 3 CPMVs can be used to construct a 6-parameter affine merge candidate and the combination of 2 CPMVs can be used to construct a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

In some embodiments, to provide a fine granularity of motion vectors inside a block, Regression based Motion Vector Field (RMVF) tool was implemented. This tool attempts to model the motion vectors of each block on a sub-block level based on the spatially neighboring motion vectors.

Figure 10:
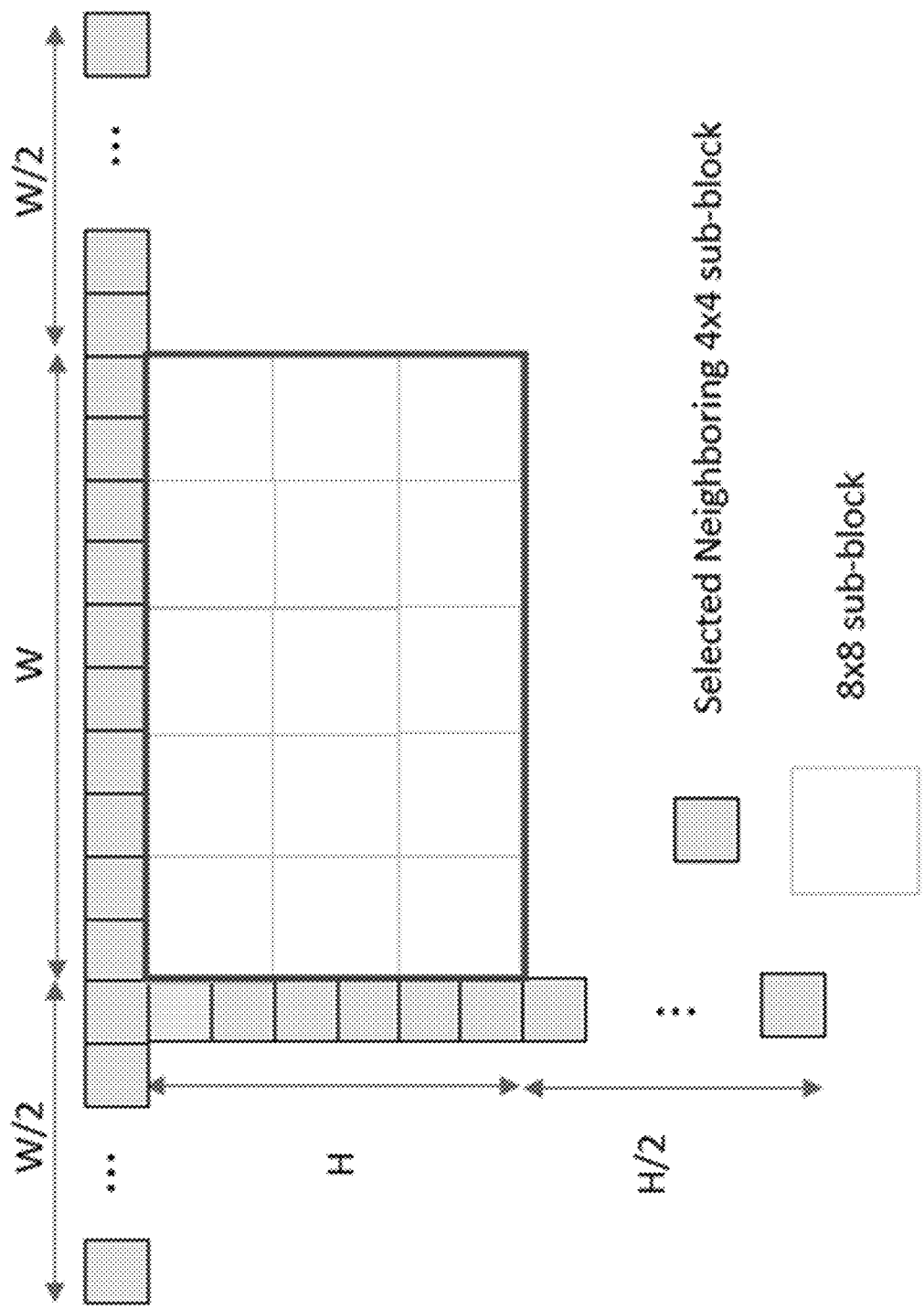
FIG. 10 is a block diagram illustrating the exemplary neighboring motion vectors that are used in motion parameter derivation in accordance with some implementations of the present disclosure.

FIG. 10 is a block diagram illustrating the exemplary neighboring motion vectors that are used in motion parameter derivation in accordance with some implementations of the present disclosure.

FIG. 10 illustrates the neighboring 4×4 block motions that are used for motion parameter derivation. As seen, motion vectors of one column and one row of immediate neighboring 4×4 sub-blocks (and their center locations), at the left and the above side of the current block respectively, are used in the regression process.

Figure 11:
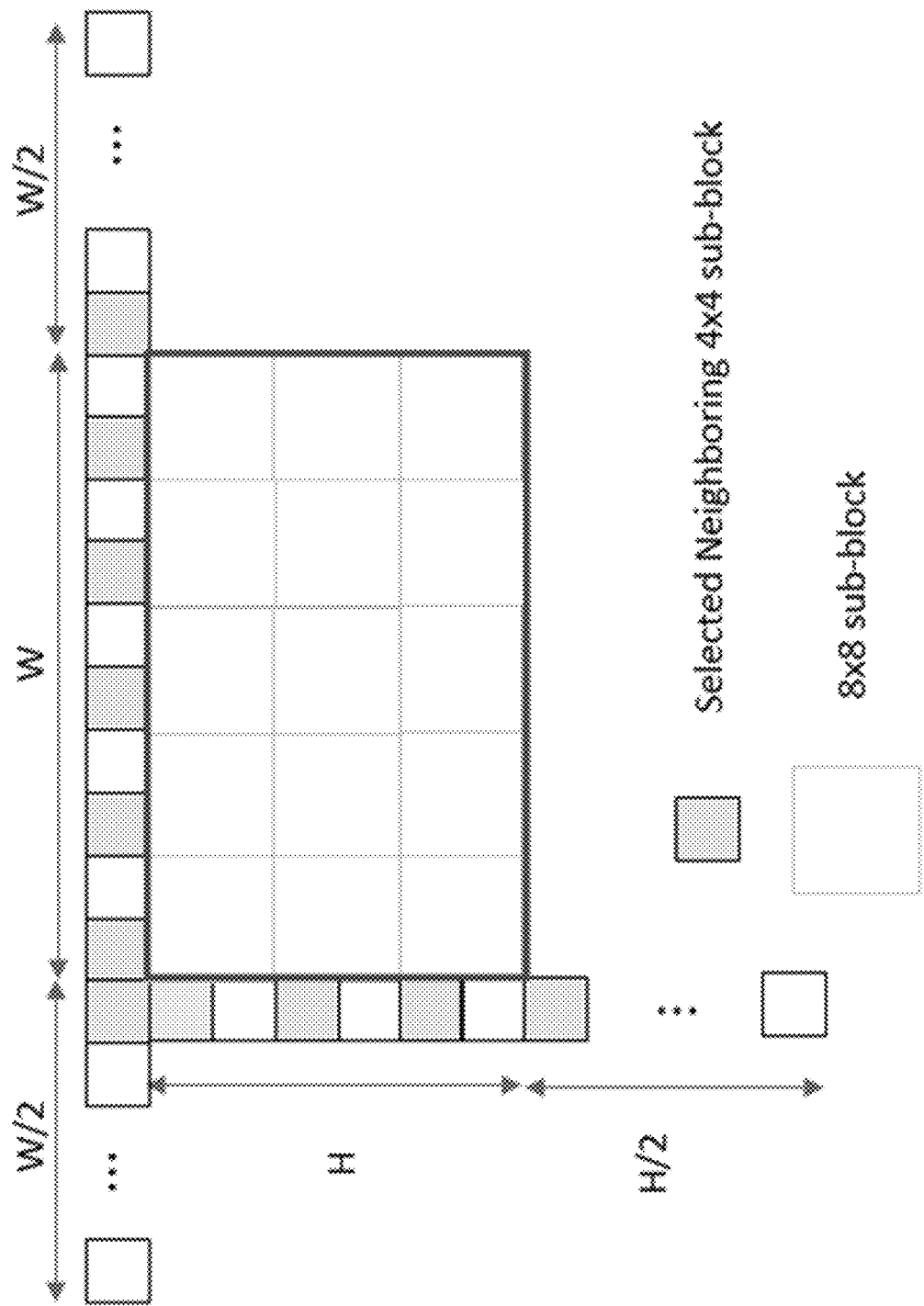
FIG. 11 is a block diagram illustrating the exemplary reduced neighboring motion vector candidates for motion parameter derivation in accordance with some implementations of the present disclosure.

FIG. 11 is a block diagram illustrating the exemplary reduced neighboring motion vector candidates for motion parameter derivation in accordance with some implementations of the present disclosure.

To reduce the number of neighboring motion information for parameter derivation, the method of FIG. 11 is used in which almost half of the neighboring 4×4 motion blocks are used for motion parameter derivation.

Five regions (bottom-left, left, top-left, top, top-right) as shown in the FIGS. 10 and 11 are used when collecting the motion information for motion parameter derivation. The sizes of the above-right and bottom-left reference motion regions are limited to only half of the corresponding width or height of the current block respectively.

In RMVF mode, motion of the current block is defined by a 6-parameter motion model. These parameters $a_{xx}$, $a_{xy}$, $a_{yx}$, $a_{yy}$, $b_x$ and $b_x$ are calculated by solving a linear regression model in mean square error (MSE) method. The inputs to the regression model consist of the center locations (x, y) and motion vectors ($mv_x$ and $mv_y$) of the available neighboring 4×4 sub-blocks as defined above.

Motion vector ($MV_X$, $MV_Y$) for an 8×8 sub-block with center location at ($X_S$, $Y_S$) is then calculated as:

$$\begin{bmatrix} MV_X \\ MV_Y \end{bmatrix} = \begin{bmatrix} a_{xx} & a_{xy} \\ a_{yx} & a_{yy} \end{bmatrix} \begin{bmatrix} X_s \\ Y_s \end{bmatrix} + \begin{bmatrix} b_x \\ b_y \end{bmatrix} \quad (3)$$

The motion vectors are calculated for 8×8 sub-blocks relative to the center location of each sub-block. Consequently, motion compensation is also applied in 8×8 sub-block accuracy in the RMVF mode.

In order to have efficient modelling for the motion vector field, RMVF tool is applied only in the cases that at least three of those candidate regions described above containing at least one motion vector each.

In some embodiments, to derive the motion field inside a current block, according to the affine merge mode in the current AVS, CPMVs from limited pre-defined block locations are used. However, these CPMVs may not be always optimal and often times may also be unavailable. To derive more accurate motion information for a current block, it is desirable to model motion behavior of the current block by considering motion information from spatial neighboring blocks in a more flexible manner.

In some embodiments, methods and systems for improving the affine merge mode in the current AVS standards are implemented. Specifically, an affine motion model is derived by jointly considering motion information from multiple spatial neighboring blocks. The methods and systems disclosed herein may be implemented in various manners. In one embodiment, the methods may be implemented in a new coding mode, e.g. a new merge mode. Alternatively, the methods may be signaled in a similar manner as the current affine merge mode, e.g. with its control point MVs added in merge candidate list.

Affine Motion Model Derivation

According to equation (2), affine motion model may be rewritten as:

$V_x = a*x + b*y + c$ $V_y = d*x + e*y + f \quad (4)$ where (c, f) are delta translation parameters, (a, b) are delta zoom and rotation parameters for the horizontal direction, (d, e) are delta zoom and rotation parameters for the vertical direction, (x, y) and ($v_x$ and $v_y$) are the center locations and motion vectors of a coding block or a sub-block.

In one embodiment, the model parameters a, b, c, d, e and f may be calculated by solving a linear regression model as the RMVF tool above, while the input to the regression model may be a configurable subset of motion information of neighboring blocks from the five conventional regions (bottom-left, left, top-left, top, top-right) as shown in FIG. 10. Note that the subset may be predefined (e.g., only the above and left regions, or only the neighboring blocks located around the current block corners) or signaled in the slice header.

In another embodiment, the model parameters a, b, c, d, e and f may be calculated by the following approximation:

Affine model parameters a, b, d, e corresponding to delta zoom and rotation motion may be calculated by:

$$\frac{\partial V_x}{\partial x} = a, \frac{\partial V_x}{\partial y} = b \quad (5)$$

$$\frac{\partial V_y}{\partial x} = d, \frac{\partial V_y}{\partial y} = e$$

Note that the partial derivative may be estimated by the horizontal and vertical gradient of the neighboring motion vectors. Thus, the approximated affine model parameters can be derived by:

$$\hat{a} = \frac{1}{NH-1}\sum_{i=1}^{NH-1} g_x(Vx_i^T), \hat{b} = \frac{1}{NV-1}\sum_{i=1}^{NV-1} g_y(Vx_i^L) \quad (6)$$

$$\hat{d} = \frac{1}{NH-1}\sum_{j=1}^{NH-1} g_x(Vy_j^T), \hat{e} = \frac{1}{NV-1}\sum_{j=1}^{NV-1} g_y(Vy_j^L)$$

where $V^T$ and $V^L$ are motion vectors of selected above and left spatial neighboring blocks of the current coding block. NH and NV are the number of selected above and left spatial neighboring blocks. $g_x$ and $g_y$ are the gradients in the horizontal and vertical directions. $\hat{a}$, $\hat{b}$, $\hat{d}$ and $\hat{e}$ are the approximated values of parameter a, b, d and e, respectively.

In one embodiment, $g_x$ and $g_y$ may be calculated by the below equation:

$$g_x(Vx_i^T) = \frac{Vx_i^T - Vx_{i-1}^T}{x_i^T - x_{i-1}^T}, g_y(Vx_i^L) = \frac{Vx_i^L - Vx_{i-1}^L}{y_i^L - y_{i-1}^L} \quad (7)$$

$$g_x(Vy_i^T) = \frac{Vy_i^T - Vy_{i-1}^T}{x_i^T - x_{i-1}^T}, g_y(Vy_i^L) = \frac{Vy_i^L - Vy_{i-1}^L}{y_i^L - y_{i-1}^L}$$

In another embodiment, $g_x$ and $g_y$ may be calculated by the below equation:

$$g_x(Vx_i^T) = \frac{Vx_0^T - Vx_{NH-1}^T}{x_0^T - x_{NH-1}^T}, g_y(Vx_i^L) = \frac{Vx_0^L - Vx_{NV-1}^L}{y_0^L - y_{NV-1}^L} \quad (8)$$

$$g_x(Vy_i^T) = \frac{Vy_0^T - Vy_{NH-1}^T}{x_0^T - x_{NH-1}^T}, g_y(Vy_i^L) = \frac{Vy_0^L - Vy_{NV-1}^L}{y_0^L - y_{NV-1}^L}$$

where $V_0^T$ and $V_{NH-1}^T$ are the motion vectors of the first and last selected above neighboring blocks, while $V_0^L$ and $V_{NV-1}^L$ are the motion vectors of the first and last selected left neighboring blocks.

Figure 12:
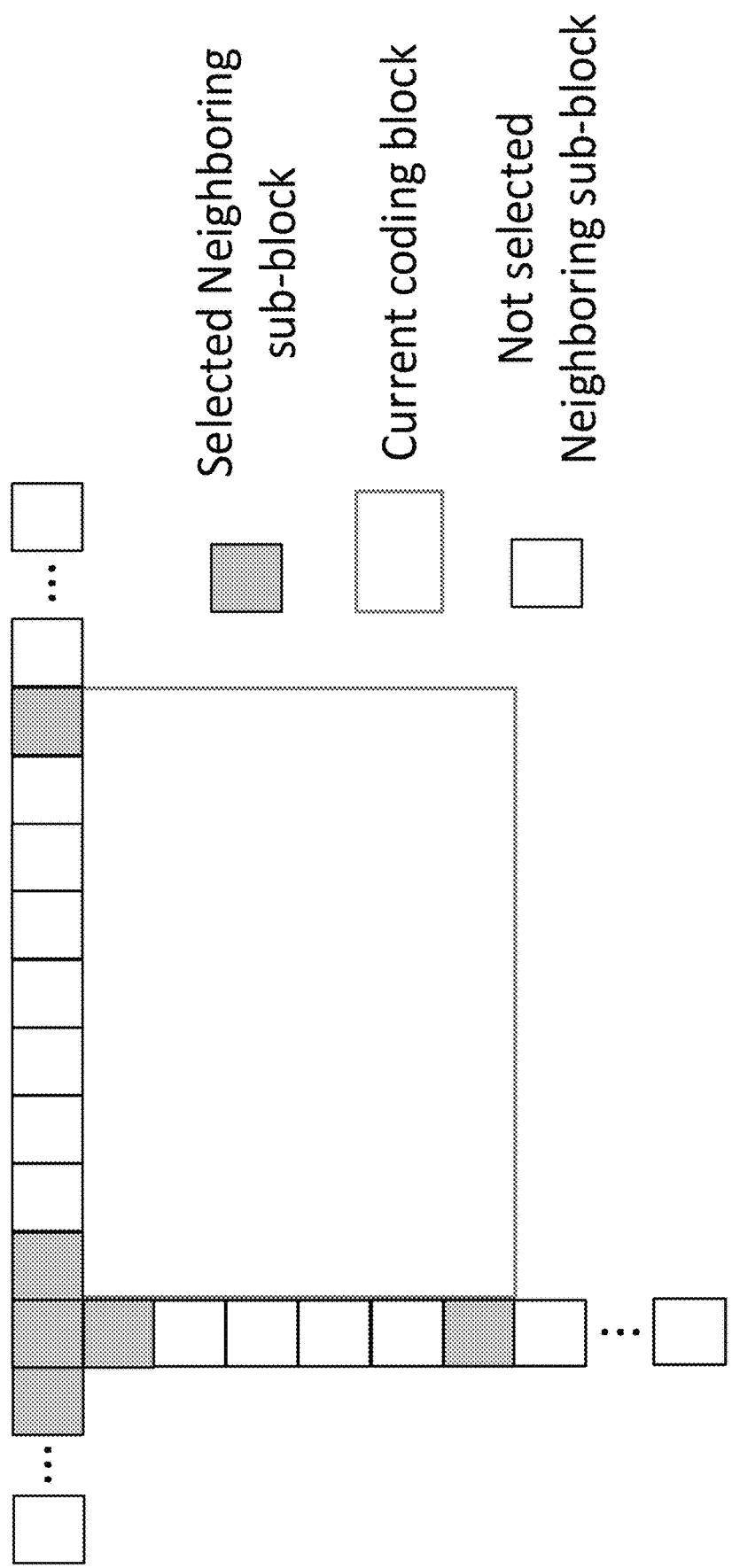
FIG. 12 is a block diagram illustrating an exemplary subset of available spatial sub-blocks to be selected in accordance with some implementations of the present disclosure.

Once the four approximated affine model parameters $\hat{a}$, $\hat{b}$, $\hat{d}$ and $\hat{e}$ are derived as in equation (6), the other two translational parameters can be derived by the following equations.

$$\hat{c} = \tilde{V}_x - \hat{a}*\tilde{x} - \hat{b}*\tilde{y}, \hat{f} = \tilde{V}_y - \hat{d}*\tilde{x} - \hat{e}*\tilde{y} \quad (9)$$

where $\tilde{V}_x$, $\tilde{V}_y$, $\tilde{x}$ and $\tilde{y}$ are the motion vector and center location of one or multiple neighboring blocks. In one embodiment, one specific neighboring block may be used based on equation (9), e.g., the top-left neighboring block if the motion information of that specific block is available. In another embodiment, a group of neighboring blocks may be used based on equation (9) and in this case $\tilde{V}_x$, $\tilde{V}_y$, $\tilde{x}$ and $\tilde{y}$ could be the averaged motion and center location of those blocks. FIG. 12 is a block diagram illustrating an exemplary subset of available spatial sub-blocks to be selected in accordance with some implementations of the present disclosure. For example, the group of neighboring blocks may consist of multiple neighboring blocks close to the top-left corner of the current coding block. As shown in FIG. 12, these blocks may be the 4 Selected neighboring blocks (shown as shaded) close to the top-left corner of the current coding block.

In some embodiments, the selection of the neighboring blocks may be dependent on any combination of the following exemplary factors.

In one embodiment, the selection may be position dependent. In one example, the neighboring blocks located at the top left, or/and top right, or/and bottom left corner of the current block may be selected.

In another embodiment, the selection may be spatial distance dependent. In one example, as shown in the FIG. 10, the top/left neighboring blocks located within 2 W/1.5H pixel distances from the current block are selected. W is the width of the current coding block and H is the height of the current coding block. Alternatively, as shown in the FIG. 11, a reduced number of neighboring blocks (e.g., every other neighboring block) are selected.

In another embodiment, the selection may be coding mode dependent. In one example, if one neighboring block is coded in intra mode, motion information may be unavailable thus this neighboring block is not selected. In another example, if one neighboring block is coded in merge mode, where the inherited motion information may not be accurate, this neighboring block is not selected.

In another embodiment, the selection may be priority dependent. In one example, the neighboring blocks may be selected according to the similar ordering when constructing the affine merge mode candidate list. When the selection is priority dependent, a threshold number may be also defined. If the number of selected neighboring blocks reaches the defined threshold value, no more neighboring blocks may be selected.

In another embodiment, the selection may be affine model dependent. In one example, a higher number of selected neighboring blocks may be required by the 6-parameter affine model derivation than the 4-parameter affine model derivation.

Model Selection

Equation (4) is a general representation of a 6-parameter affine motion model. In one embodiment, the 6-parameter model is always used for the affine model derivation. In another embodiment, instead of always using the 6-parameter model, affine motion models with different number of parameters may be used, e.g., a 4-parameter or a 2-parameter model. One advantage of using less than 6-parameter model is that it works even with limited availability of motion information of the neighboring blocks. Another advantage of using less than 6-parameter model is that in certain cases a 4-parameter or a 2-parameter affine motion model may fit the motion information of available neighboring blocks similarly well as a 6-parameter model, but with obviously less derivation computation complexity. Lastly but not leastly important, if approximation based calculation as described above is used, it is possible that none of the three models (2, 4 and 6-parameter) is optimal. Thus, a third advantage is that a less than 6-parameter model may fit the motion information of available neighboring blocks better than a 6-parameter model.

For the 4-parameter model, a=e, b=−d. In this case, the estimated parameters $\hat{a}$, $\hat{b}$, $\hat{d}$ and $\hat{e}$ may be calculated using the following methods:

Method 1: Using Motion Information from Only the Above (or Top) Selected Neighboring Blocks:

$$\hat{a} = \frac{1}{NH-1}\Sigma_{i=1}^{NH-1} g_x(Vx_i^T)$$

$$\hat{d} = \frac{1}{NH-1}\Sigma_{j=1}^{NH-1} g_x(Vy_j^T)$$

Method 2: Using Motion Information from Only the Left Selected Neighboring Blocks:

$$\hat{b} = \frac{1}{NV-1}\Sigma_{i=1}^{NV-1} g_y(Vx_i^L)$$

$$\hat{e} = \frac{1}{NV-1}\Sigma_{j=1}^{NV-1} g_y(Vy_j^L)$$

Method 3: Using Motion Information from Both the Above and the Left Selected Neighboring Blocks:

$$\hat{a} = \frac{1}{NH-1}\Sigma_{i=1}^{NH-1} g_x(Vx_i^T),$$

$$\hat{b} = \frac{1}{NV-1}\Sigma_{i=1}^{NV-1} g_y(Vx_i^L)$$

In the three methods disclosed above, the parameters not listed in those equations can be easily derived accordingly based on $\hat{a}=\hat{e}$, and $\hat{b}=-\hat{d}$. For the 4-parameter model, the other two parameters $\hat{c}$ and $\hat{f}$ may be estimated similarly as from equation (9).

For the 2-parameter model, a=b=e=d=0. According to equation (4), the only two parameters c and f need to be derived. The approximated values $\hat{c}$ and $\hat{f}$ may still be estimated based on equation (9), but with $\hat{a}$, $\hat{b}$, $\hat{d}$ and $\hat{e}$ assumed to be 0. In other words, values $\hat{c}$ and $\hat{f}$ may be derived directly based on $\tilde{V}_x$ and $\tilde{V}_y$, i.e., the motion information of a specific neighboring block or the averaged motion of a group of neighboring blocks as explained in previous descriptions.

According to the above analysis, due to the approximated derivation, it is possible that some of the three models (2, 4 and 6-parameter) derived are not optimal. Thus, affine motion models with different number of parameters may be selected in different manners.

In one embodiment, one of the three affine models (e.g. 6, 4 or 2-parameter model) may be predefined or selected/signaled at a certain coding level, e.g., at block level, CTU level, in slice or picture header, and/or in sequence parameter set, and used by all the block(s) at and/or below that level for deriving motion information. In this case, one model will be always used with the scope of the model selection signaling level and/or below.

In another embodiment, all the three affine models are derived based on the motion information of the selected neighboring blocks and one of the three models would be chosen adaptively. In this case, one specific method is to select the model with minimum model prediction error.

In one embodiment, the model prediction error may be estimated by the sum of the distance between the MV estimated by one candidate model and the actual MV of each used neighboring block. The distance may be measured by the weighted sum of square difference (SSD) or the weighted sum of absolute difference (SAD). For example, given a model parameter (â, b̂, ĉ, d̂, ê, f̂), the derived motion vector $\hat{V}_i$ for i-th neighboring block centered at $(x_i, y_i)$ can be calculated with equation (4). The distance between the derived $\hat{V}_i$ and the actual $V_i$ of i-th neighboring block is calculated as follows:

$$\text{error}_i = W_i * (|\hat{V}_{x_i} - V_{x_i}| + |\hat{V}_{y_i} - V_{y_i}|) \quad (10)$$

where $W_i$ is the weight for the i-th neighboring block. In one embodiment, the value of $W_i$ may be determined by the distance between the i-th neighboring block and the current block. The weight is larger if the neighboring block is closer to the current block. Thus, the total model prediction error is a sum of the $\text{error}_i$ for all selected neighboring blocks. The same operations may be applied at both the encoder and the decoder side.

In another embodiment, the model prediction error may be estimated by the distance between the MV estimated by one candidate model and the actual MV of the current block (e.g., coding block level MV). Similarly, the distance may be measured by a square difference (SD) or the absolute difference (AD).

Adaptive Enabling of the Proposed Model Derivation Methods

In order to have efficient modelling, the affine model derivation method disclosed herein may be applied only when certain criteria are satisfied.

In one embodiment, one condition is that the number of available neighboring blocks from a region (e.g., bottom-left, left, top-left, top, top-right region) should be larger than a threshold, e.g., 2. The threshold number may be different for different regions, for example, the top region, which is directly above the current coding block, may have a higher threshold vale. The threshold number may be compared to the combined number of available neighboring blocks from only the above or the left regions, where the above region may include top-left, top and top-right region, while the left region may include left and bottom-left region. Note that, the top-left corner neighboring block may or may not be counted towards both the above or left region.

In another embodiment, one condition is that the number of regions which have at least the threshold number of available neighboring blocks is larger than a threshold, e.g., 2. This means, for the above region, at least a threshold number (such as 2) of the three regions (top-left, top, top-right) have at least a same or different threshold number of available neighboring blocks. For the left region, at least a threshold number (such as 2) of the three regions (top-left, left, bottom-left) have at least the same or different threshold number of available neighboring blocks.

Model Application Scenarios

The methods disclosed herein may be implemented in various manners.

In one embodiment, the derived affine model parameters may be signaled in a new coding mode, e.g. as a new merge mode. In another embodiment, the derived affine model parameters may be converted into control points motion vectors (CPMVs) (e.g., a set of 2 or 3 CPMVs), and then added into the current affine merge candidate list.

In this case, the sub-block MVs inside the current coding block can be derived by equation (4). The size of a sub-block may be adaptively determined. In one example, the determination of the sub-block size may depend on whether the current coding block is un-predicted or bi-predicted. If the current block is uni-predicted, the size of the sub-block may be 4×4. Otherwise if the current block is bi-predicted, the size of the sub-block may be 8×8. In another example, the size of the sub-block is always 4×4 or 8×8 regardless of whether the current coding block is uni-predicted or bi-predicted. In yet another example, the determination may be based on the aspect ratio of the current block, e.g. the sub-block size may be determined with an aspect ratio the same as the current block, with a minimum lateral size of either 4 or 8. When the ratio between the width and the height of the current block is 1:2, the width and the height of the sub-block may be set as 4 and 8 respectively, with a minimum lateral size equal to 4. The minimum lateral size may be determined based on whether the current block is uni-predicted or bi-predicted. For example, it may be set to 4 if the current block is uni-predicted, and 8 if the current block is bi-predicted.

In another embodiment, the proposed affine model derivation method may be used for deriving a predictor for regular affine mode (i.e. affine explicit mode). In this case, motion vector difference (MVD) of each CPMV is calculated based on its MV predictor derived by the affine model derivation method disclosed herein, and then explicitly signaled. Because multiple sets of predictors may be derived using the affine model derivation method, according to an embodiment of this disclosure, an index may be signaled to indicate which set of the predictors derived is used as the actual CPMV predictor for the current block. Each set may contain different number of CPMV predictors, e.g. 2 or 3, and as a result, depending on the number of predictors in a set, the number of MVDs signaled for CPMVs of the current block may also be different. For example, if a set contains three predictors, three MVDs are signaled. If a set contains only two predictors, only two MVDs need to be signaled.

In yet another embodiment, the affine model derivation method disclosed herein may be used to speed up motion estimation process for regular affine mode (affine explicit mode) at the encoder side. Specifically, the method may be used to derive an initial set of CPMVs, which can be quickly refined by subsequent optical flow based procedures iteratively.

Figure 13:
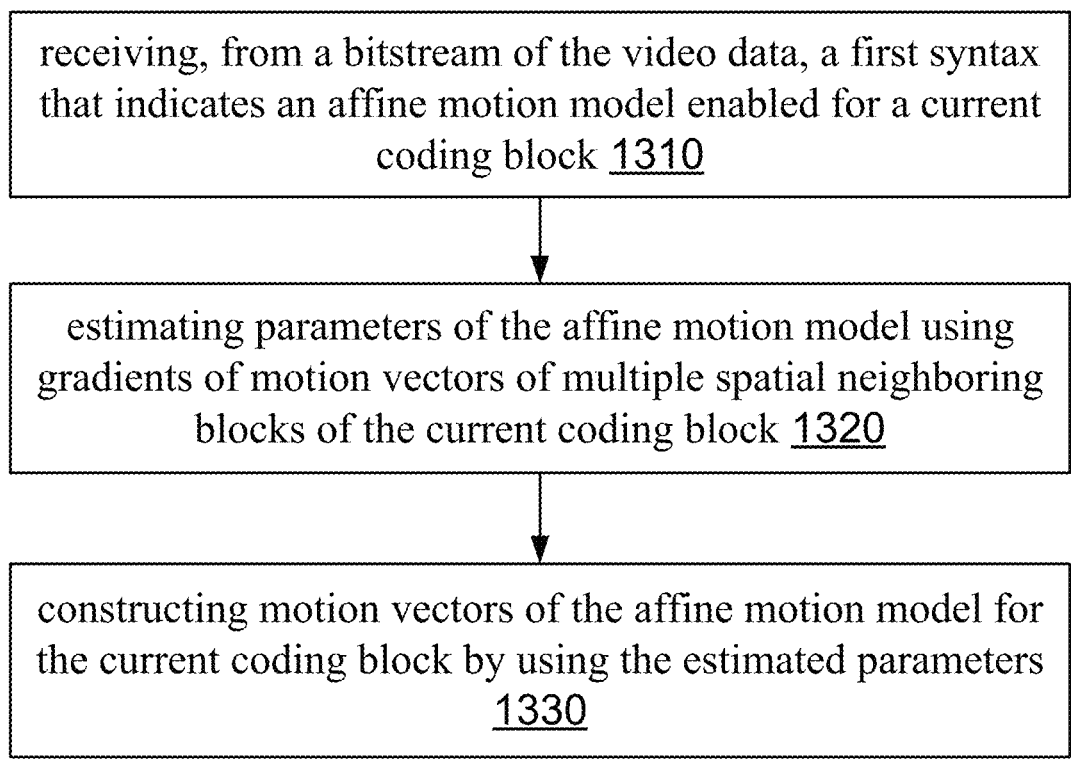
FIG. 13 is a flowchart illustrating an exemplary process of deriving an affine motion model based on a joint consideration of the motion information from multiple spatial neighboring blocks by using gradients of motion vectors of the multiple spatial neighboring blocks in accordance with some implementations of the present disclosure.

FIG. 13 is a flowchart illustrating an exemplary process 1300 of deriving an affine motion model based on a joint consideration of the motion information from multiple spatial neighboring blocks by using gradients of motion vectors of the multiple spatial neighboring blocks in accordance with some implementations of the present disclosure.

The video encoder 20/decoder 30, receives, from the bitstream of the video data, a first syntax that indicates an affine motion model enabled for a current coding block (1310).

The video encoder 20/decoder 30, estimates the parameters of the affine motion model using the gradients of motion vectors of multiple spatial neighboring blocks of the current coding block (1320).

The video encoder 20/decoder 30, constructs the motion vectors of the affine motion model for the current coding block by using the estimated parameters (1330).

In some embodiments, estimating the parameters further includes: calculating the gradients of the selected top and left spatial neighboring blocks of the current coding block.

In some embodiments, estimating the parameters further includes: receiving, from the bitstream, a second syntax that indicates the affine motion model is one of a 6-parameter, 4-parameter, and 2-parameter affine motion model; and in accordance with a determination from the second syntax that the affine motion model is a 6-parameter affine motion model: calculating parameters a, b, d, e of the 6-parameter affine motion model corresponding to delta zoom and rotation motion by:

$$\frac{\partial V_x}{\partial x} = a, \frac{\partial V_x}{\partial y} = b$$

$$\frac{\partial V_y}{\partial x} = d, \frac{\partial V_y}{\partial y} = e$$

wherein a and b are delta zoom and rotation parameters for the horizontal direction respectively, d and e are delta zoom and rotation parameters for the vertical direction respectively, (x, y) and ($v_x$ and $v_y$) are the center location and motion vector of a spatial neighboring block of the multiple spatial neighboring blocks of the current coding block.

In some embodiments, estimating the parameters further includes: calculating approximated values of the parameters a, b, d, e of the 6-parameter affine motion model respectively by:

$$\hat{a} = \frac{1}{NH-1}\Sigma_{i=1}^{NH-1}g_x(Vx_i^T), \hat{b} = \frac{1}{NV-1}\Sigma_{i=1}^{NV-1}g_y(Vx_i^L)$$

$$\hat{d} = \frac{1}{NH-1}\Sigma_{j=1}^{NH-1}g_x(Vy_j^T), \hat{e} = \frac{1}{NV-1}\Sigma_{j=1}^{NV-1}g_y(Vy_j^L)$$

wherein ($Vx_i^T$, $Vy_j^T$) is the motion vector of a selected top spatial neighboring block of the current coding block at a location ($x_i$, $y_i$), ($Vx_i^L$, $Vy_j^L$) is the motion vector of a selected left spatial neighboring block of the current coding block at a location ($x_i$, $y_i$), NH is the number of the selected top spatial neighboring blocks, NV is the number of the selected left spatial neighboring blocks, $g_x$ is the gradient in the horizontal direction, $g_y$ is the gradient in the vertical direction, and $\hat{a}$, $\hat{b}$, $\hat{d}$ and $\hat{e}$ are the approximated values of the parameters a, b, d and e, respectively.

In some embodiments, estimating the parameters further includes:

calculating $g_x$ and $g_y$ by:

$$g_x(Vx_i^T) = \frac{Vx_i^T - Vx_{i-1}^T}{x_i^T - x_{i-1}^T}, g_y(Vx_i^L) = \frac{Vx_i^L - Vx_{i-1}^L}{y_i^L - y_{i-1}^L}$$

$$g_x(Vy_i^T) = \frac{Vy_i^T - Vy_{i-1}^T}{x_i^T - x_{i-1}^T}, g_y(Vy_i^L) = \frac{Vy_i^L - Vy_{i-1}^L}{y_i^L - y_{i-1}^L}$$

In some embodiments, estimating the parameters further includes:

calculating $g_x$ and $g_y$ by:

$$g_x(Vx_i^T) = \frac{Vx_0^T - Vx_{NH-1}^T}{x_0^T - x_{NH-1}^T}, g_y(Vx_i^L) = \frac{Vx_0^L - Vx_{NV-1}^L}{y_0^L - y_{NV-1}^L}$$

$$g_x(Vy_i^T) = \frac{Vy_0^T - Vy_{NH-1}^T}{x_0^T - x_{NH-1}^T}, g_y(Vy_i^L) = \frac{Vy_0^L - Vy_{NV-1}^L}{y_0^L - y_{NV-1}^L}$$

wherein $V_0^T$ and $V_{NH-1}^T$ are the motion vectors of the first and the last selected top spatial neighboring blocks of the current coding block respectively, and $V_0^L$ and $V_{NV-1}^L$ are the motion vectors of the first and the last selected left spatial neighboring blocks of the current coding block respectively.

In some embodiments, estimating the parameters further includes calculating delta translation parameters by:

$$\hat{c} = \tilde{V}_x - \hat{a}*\tilde{x} - \hat{b}*\tilde{y}, \hat{f} = \tilde{V}_y - \hat{d}*\tilde{x} - \hat{e}*\tilde{y}$$

wherein ĉ and f̂ are the approximate delta translation parameters, ($\tilde{V}_x$, $\tilde{V}_y$) is the approximate motion vector of one or more neighboring blocks, and ($\tilde{x}$, $\tilde{y}$) is the approximate center location of one or more neighboring blocks.

In some embodiments, the selected top and left spatial neighboring blocks of the current coding block includes the top and left spatial neighboring blocks within a predefined distance from the current coding block.

In some embodiments, the selected top and left spatial neighboring blocks of the current coding block includes the top and left spatial neighboring blocks not coded by an intra mode or a merge mode.

In some embodiments, estimating the parameters further includes: in accordance with a determination from the second syntax that the affine motion model is a 4-parameter affine motion model: calculating the parameters a, b, d, e by:

$$a=e, b=-d$$

in accordance with a determination from the second syntax that the affine motion model is a 2-parameter affine motion model: calculating the parameters a, b, d, e by:

$$a=b=e=d=0$$

In some embodiments, estimating the parameters further includes: determining an optimal affine motion model from one of 6-parameter, 4-parameter, and 2-parameter affine motion model by minimizing a model prediction error based on the motion parameter information from the multiple spatial neighboring blocks of the current coding block.

In some embodiments, minimizing a model prediction error includes estimating and minimizing a sum of distances between a respective motion vector estimated by one candidate parameter affine motion model and a respective actual motion vector of each calculated spatial neighboring block.

In some embodiments, constructing motion vectors further includes: converting the estimated parameters into control point motion vectors (CPMVs), and adding the CPMVs into a current affine merge candidate list.

In some embodiments, constructing motion vectors further includes: deriving a motion vector predictor for an affine mode.

In some embodiments, constructing motion vectors further includes: calculating motion vector difference (MVD) of a respective control point motion vector (CPMV) based on the derived motion vector predictor of the respective CPMV.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of coding video data, comprising:
   receiving, from a bitstream of the video data, a first syntax that indicates an affine motion model enabled for a current coding block;
   estimating parameters of the affine motion model using gradients of motion vectors of multiple spatial neighboring blocks of the current coding block; and
   constructing motion vectors of the affine motion model for the current coding block by using the estimated parameters,
   wherein estimating the parameters comprises:
   receiving, from the bitstream, a second syntax that indicates the affine motion model is one of a 6-parameter, 4-parameter, and 2-parameter affine motion model; and
   in accordance with a determination from the second syntax that the affine motion model is a 6-parameter affine motion model:
   calculating approximated values of the parameters a, b, d, e of the 6-parameter affine motion model respectively by:

$$\hat{a} = \frac{1}{NH-1}\Sigma_{i=1}^{NH-1}g_x(Vx_i^T), \hat{b} = \frac{1}{NV-1}\Sigma_{i=1}^{NV-1}g_y(Vx_i^L)$$

$$\hat{d} = \frac{1}{NH-1}\Sigma_{j=1}^{NH-1}g_x(Vy_j^T), \hat{e} = \frac{1}{NV-1}\Sigma_{j=1}^{NV-1}g_y(Vy_j^L)$$

wherein $(Vx_i^T, Vy_j^T)$ is motion vector of a selected top spatial neighboring block of the current coding block at a location $(x_i, y_i)$, $(Vx_i^L, Vy_j^L)$ is motion vector of a selected left spatial neighboring block of the current coding block at a location $(x_i, y_i)$, NH is number of the selected top spatial neighboring blocks, NV is number of the selected left spatial neighboring blocks, $g_x$ is the gradient in a horizontal direction, $g_y$ is the gradient in a vertical direction, $\hat{a}$, $\hat{b}$, $\hat{d}$ and $\hat{e}$ are the approximated values of the parameters a, b, d and e, respectively, a and b are delta zoom and rotation parameters for horizontal direction respectively, d and e are delta zoom and rotation parameters for vertical direction respectively.

2. The method according to claim 1, wherein estimating the parameters comprises:
   calculating gradients of selected top and left spatial neighboring blocks of the current coding block.

3. The method according to claim 1, wherein estimating the parameters comprises:
   calculating parameters a, b, d, e of the 6-parameter affine motion model corresponding to delta zoom and rotation motion by:

$$\frac{\partial V_x}{\partial x} = a, \frac{\partial V_x}{\partial y} = b$$

$$\frac{\partial V_y}{\partial x} = d, \frac{\partial V_y}{\partial y} = e$$

wherein (x, y) and ($v_x$ and $v_y$) are center location and motion vector of the current coding block.

4. The method according to claim 1, wherein estimating the parameters further comprises:
   calculating $g_x$ and $g_y$ by:

$$g_x(Vx_i^T) = \frac{Vx_i^T - Vx_{i-1}^T}{x_i^T - x_{i-1}^T}, g_y(Vx_i^L) = \frac{Vx_i^L - Vx_{i-1}^L}{y_i^L - y_{i-1}^L}$$

$$g_x(Vy_i^T) = \frac{Vy_i^T - Vy_{i-1}^T}{x_i^T - x_{i-1}^T}, g_y(Vy_i^L) = \frac{Vy_i^L - Vy_{i-1}^L}{y_i^L - y_{i-1}^L}.$$

5. The method according to claim 1, wherein estimating the parameters further comprises:
calculating $g_x$ and $g_y$ by:

$$g_x(Vx_i^T) = \frac{Vx_0^T - Vx_{NH-1}^T}{x_0^T - x_{NH-1}^T}, g_y(Vx_i^L) = \frac{Vx_0^L - Vx_{NV-1}^L}{y_0^L - y_{NV-1}^L}$$

$$g_x(Vy_i^T) = \frac{Vy_0^T - Vy_{NH-1}^T}{x_0^T - x_{NH-1}^T}, g_y(Vy_i^L) = \frac{Vy_0^L - Vy_{NV-1}^L}{y_0^L - y_{NV-1}^L}$$

wherein $V_0^T$ and $V_{NH-1}^T$ are motion vectors of a first and a last selected top spatial neighboring blocks of the current coding block respectively, and $V_0^L$ and $V_{NV-1}^L$ are motion vectors of a first and a last selected left spatial neighboring blocks of the current coding block respectively.

6. The method according to claim 1, wherein estimating the parameters further comprises calculating delta translation parameters by:

$$\hat{c} = \tilde{V}_x - \hat{a}*\tilde{x} - \hat{b}*\tilde{y}, \hat{f} = \tilde{V}_y - \hat{d}*\tilde{x} - \hat{e}*\tilde{y}$$

wherein $\hat{e}$ and $\hat{f}$ are approximate delta translation parameters, $(\tilde{V}_x, \tilde{V}_y)$ is approximate motion vector of one or more neighboring blocks, and $(\tilde{x}, \tilde{y})$ is approximate center location of one or more neighboring blocks.

7. The method according to claim 2, wherein the selected top and left spatial neighboring blocks of the current coding block includes top and left spatial neighboring blocks within a predefined distance from the current coding block.

8. The method according to claim 2, wherein the selected top and left spatial neighboring blocks of the current coding block includes top and left spatial neighboring blocks not coded by an intra mode or a merge mode.

9. The method according to claim 1, wherein estimating the parameters further comprises:
in accordance with a determination from the second syntax that the affine motion model is a 4-parameter affine motion model:
calculating the parameters a, b, d, e by:

$a=e, b=-d$ in accordance with a determination from the second syntax that the affine motion model is a 2-parameter affine motion model:
calculating the parameters a, b, d, e by:

$a=b=e=d=0$.

10. The method according to claim 1, wherein estimating the parameters comprises:
determining an optimal affine motion model from one of 6-parameter, 4-parameter, and 2-parameter affine motion model by minimizing a model prediction error based on motion parameter information from the multiple spatial neighboring blocks of the current coding block.

11. The method according to claim 10, wherein minimizing a model prediction error includes estimating and minimizing a sum of distances between a respective motion vector estimated by one candidate parameter affine motion model and a respective actual motion vector of each calculated spatial neighboring block.

12. The method according to claim 1, wherein constructing motion vectors comprises:
converting the estimated parameters into control point motion vectors (CPMVs), and adding the CPMVs into a current affine merge candidate list.

13. The method according to claim 1, wherein constructing motion vectors comprises:
deriving a motion vector predictor for an affine mode.

14. The method according to claim 13, wherein constructing motion vectors further comprises:
calculating motion vector difference (MVD) of a respective control point motion vector (CPMV) based on the derived motion vector predictor of the respective CPMV.

15. An electronic apparatus comprising:
one or more processing units;
memory coupled to the one or more processing units; and
a plurality of programs stored in the memory that, when executed by the one or more processing units, cause the electronic apparatus to perform operations comprising:
receiving, from a bitstream of video data, a first syntax that indicates an affine motion model enabled for a current coding block;
estimating parameters of the affine motion model using gradients of motion vectors of multiple spatial neighboring blocks of the current coding block; and
constructing motion vectors of the affine motion model for the current coding block by using the estimated parameters,
wherein estimating the parameters comprises:
receiving, from the bitstream, a second syntax that indicates the affine motion model is one of a 6-parameter, 4-parameter, and 2-parameter affine motion model; and
in accordance with a determination from the second syntax that the affine motion model is a 6-parameter affine motion model:
calculating approximated values of the parameters a, b, d, e of the 6-parameter affine motion model respectively by:

$$\hat{a} = \frac{1}{NH-1}\Sigma_{i=1}^{NH-1}g_x(Vx_i^T), \hat{b} = \frac{1}{NV-1}\Sigma_{i=1}^{NV-1}g_y(Vx_i^L)$$

$$\hat{d} = \frac{1}{NH-1}\Sigma_{j=1}^{NH-1}g_x(Vy_j^T), \hat{e} = \frac{1}{NV-1}\Sigma_{j=1}^{NV-1}g_y(Vy_j^L)$$

wherein $(Vx_i^T, Vy_j^T)$ is motion vector of a selected top spatial neighboring block of the current coding block at a location $(x_i, y_i)$, $(Vx_i^L, Vy_j^L)$ is motion vector of a selected left spatial neighboring block of the current coding block at a location $(x_i, y_i)$, NH is number of the selected top spatial neighboring blocks, NV is number of the selected left spatial neighboring blocks, $g_x$ is the gradient in a horizontal direction, $g_y$ is the gradient in a vertical direction, $\hat{a}, \hat{b}, \hat{d}$ and $\hat{e}$ are the approximated values of the parameters a, b, d and e, respectively, a and b are delta zoom and rotation parameters for horizontal direction respectively, d and e are delta zoom and rotation parameters for vertical direction respectively.

16. A non-transitory computer readable storage medium storing a plurality of programs for execution by an electronic apparatus having one or more processing units, wherein the plurality of programs, when executed by the one or more processing units, cause the electronic apparatus to perform operations comprising:
receiving, from a bitstream of video data, a first syntax that indicates an affine motion model enabled for a current coding block;

estimating parameters of the affine motion model using gradients of motion vectors of multiple spatial neighboring blocks of the current coding block; and constructing motion vectors of the affine motion model for the current coding block by using the estimated parameters, wherein estimating the parameters comprises:

receiving, from the bitstream, a second syntax that indicates the affine motion model is one of a 6-parameter, 4-parameter, and 2-parameter affine motion model; and in accordance with a determination from the second syntax that the affine motion model is a 6-parameter affine motion model:

calculating approximated values of the parameters a, b, d, e of the 6-parameter affine motion model respectively by:

$$\hat{a} = \frac{1}{NH-1}\sum_{i=1}^{NH-1} g_x(Vx_i^T), \quad \hat{b} = \frac{1}{NV-1}\sum_{i=1}^{NV-1} g_y(Vx_i^L)$$

$$\hat{d} = \frac{1}{NH-1}\sum_{j=1}^{NH-1} g_x(Vy_j^T) \quad \hat{e} = \frac{1}{NV-1}\sum_{j=1}^{NV-1} g_y(Vy_j^L)$$

wherein $(Vx_i^T, Vy_j^T)$ is motion vector of a selected top spatial neighboring block of the current coding block at a location $(x_i, y_i)$, $(Vx_i^L, Vy_j^L)$ is motion vector of a selected left spatial neighboring block of the current coding block at a location $(x_i, y_i)$, NH is number of the selected top spatial neighboring blocks, NV is number of the selected left spatial neighboring blocks, $g_x$ is the gradient in a horizontal direction, $g_y$ is the gradient in a vertical direction, $\hat{a}$, $\hat{b}$, $\hat{d}$ and $\hat{e}$ are the approximated values of the parameters a, b, d and e, respectively, a and b are delta zoom and rotation parameters for horizontal direction respectively, d and e are delta zoom and rotation parameters for vertical direction respectively.

17. The electronic apparatus according to claim 15, wherein estimating the parameters comprises:

calculating gradients of selected top and left spatial neighboring blocks of the current coding block.

18. The electronic apparatus according to claim 15, wherein estimating the parameters comprises:

calculating parameters a, b, d, e of the 6-parameter affine motion model corresponding to delta zoom and rotation motion by:

$$\frac{\partial V_x}{\partial x} = a, \quad \frac{\partial V_x}{\partial y} = b$$

$$\frac{\partial V_y}{\partial x} = d, \quad \frac{\partial V_y}{\partial y} = e$$

wherein (x, y) and ($v_x$ and $v_y$) are center location and motion vector of a spatial neighboring block of the multiple spatial neighboring blocks of the current coding block.

* * * * *

UNITED STATES PATENT AND TRADEMARK OFFICE
CERTIFICATE OF CORRECTION

PATENT NO. : 12,294,734 B2  
APPLICATION NO. : 17/933552  
DATED : May 6, 2025  
INVENTOR(S) : Chen et al.

Page 1 of 1

It is certified that error appears in the above-identified patent and that said Letters Patent is hereby corrected as shown below:

In the Claims

Column 29, Line 12, Claim 5: Please correct "$V_{NH-1}{}^T$" to read --$V_{NH-1}^T$--

Column 29, Line 14, Claim 5: Please correct "$V_{NV-1}{}^L$" to read --$V_{NV-1}^L$--

Column 29, Line 23, Claim 6: Please correct "$\hat{e}$" to read --$\hat{c}$--

Column 32, Line 3, Claim 16: Please correct "$\hat{a}, \hat{b}, \hat{a}$" to read --$\hat{a}, \hat{b}, \hat{d}$--

Signed and Sealed this  
Twenty-eighth Day of October, 2025

John A. Squires  
*Director of the United States Patent and Trademark Office*